(12) United States Patent
Hellman et al.

(10) Patent No.: US 7,099,885 B2
(45) Date of Patent: Aug. 29, 2006

(54) METHOD AND SYSTEM FOR COLLABORATIVE ONTOLOGY MODELING

(75) Inventors: Ziv Zalman Hellman, Jerusalem (IL); Marcel Zvi Schreiber, Jerusalem (IL); Tom Yechiel Yuval, Jerusalem (IL)

(73) Assignee: Unicorn Solutions, New York, NY (US)

( * ) Notice: Subject to any disclaimer, the term of this patent is extended or adjusted under 35 U.S.C. 154(b) by 899 days.

(21) Appl. No.: 09/866,101

(22) Filed: May 25, 2001

(65) Prior Publication Data

US 2003/0163597 A1 Aug. 28, 2003

(51) Int. Cl.
*G06F 17/30* (2006.01)

(52) U.S. Cl. .................. 707/103 R; 707/100; 707/102; 707/10

(58) Field of Classification Search .................. 707/10, 707/3, 100, 102, 103; 715/513, 501, 526; 709/217, 224
See application file for complete search history.

(56) References Cited

U.S. PATENT DOCUMENTS

| | | | | |
|---|---|---|---|---|
| 5,838,965 | A * | 11/1998 | Kavanagh et al. | 707/103 R |
| 5,878,434 | A * | 3/1999 | Draper et al. | 707/202 |
| 6,173,289 | B1 * | 1/2001 | Sonderegger et al. | 707/103 R |
| 6,569,207 | B1 * | 5/2003 | Sundaresan | 715/513 |
| 6,708,161 | B1 * | 3/2004 | Tenorio et al. | 707/2 |

OTHER PUBLICATIONS

Oracle 9I SQL Reference, Release 1 (9.0.1), Jun. 2001, Oracle Corporation.
Extensible Markup Language (XML) 1.0 (Second Edition), available at: http://www.w3.org/TR/2000/REC-xml-20001006, Nov. 2001.
XML Schema Part 0: Printer, available at http://www.w3.org/TR/xmlschema-0/ Nov. 2001.
XML Schema Part 1: Structures, available at: http://www.w3.org/TR/xmlschema-1/, Nov. 2001.
XML Schema Part 2: Datatypes, available at: http://www.w3.org/TR/xmlschema-2/, Nov. 2001.
XSL Transformations (XSLT), Version 1.0, available at: http://www.w3.org/TR/xslt, Nov. 2001.
XML Path Language (XPATH), Version 1.0, available at: http://www.w3.org/TR/xpath, Nov. 2001.
Sowa J.F., Knowledge Representation: Logical, Philosophical and Computational Foundations, Brooks/Cole, Pacific Grove, CA, 2000.
Klein, M. et al., The Relation between Ontologies and Schema-Languages: Translating OIL-Specifications in XML-Schema. 2001.
DAML: The DARPA Agent Markup Language Homepage, http://www.daml.org.2001.
About DAML, http://www.daml.org/about.html. 2001.
DAML+OIL (Mar. 2001), http://www.daml.org/2001/03/daml+oil-index.html.
Revised Language Specification, http://www.daml.org/2001/03/daml+oil.daml.
Semantic Web Activity: Resource Description Framework (RDF), 2001. http://www.w3.org/RDF/.
Resource Description Framework (RDF) Model and Syntax Specification, 1999. http://www.w3.org/TR/REC-rdf-syntax/.

(Continued)

*Primary Examiner*—Cam-Y Truong

(57) ABSTRACT

A distributed ontology system including a central computer comprising a global ontology directory, a plurality of ontology server computers, each including a repository of class and relation definitions, and a server for responding to queries relating to class and relation definitions in the repository, and a computer network connecting the central computer with the plurality of ontology server computers. A method is also described and claimed.

69 Claims, 19 Drawing Sheets

OTHER PUBLICATIONS

Welcome to OIL, http://www.ontoknowledge.org/oil. 2001.
Bechhofer, S. et al., An Informal Description of Standard OIL and Instance OIL, http://www.ontoknowledge.org/oil/down/oil-whitepaper.pdf. 2001.
Horrock, I., A Denotational Semantics for standard OIL and Instance OIL, 2000. http://www.ontoknowledge.org/oil/downl/semantics.pdf.
Welcome to the protege project, http://smi-web.stanford.edu/projects/protege/. 2001.
What is Protege-2000?, http://smi-web.stanford.edu/projects/protege/classes.html.
The Classes Tab, http://smi-web.stanford.edu/projects/protege/classes.html. 2001.
The Forms tab, http://smi-web.stanford.edu/projects/protege/forms.html. 2001.
The Instances Tab, http://smi-web.stanford.edu/projects/protege/instances.html. 2001.
Knowledge Interchange Format (KIF), http://logic.stanford.edu/kif/ 2001.
Knowledge Interchange Format:Draft Proposed American National Standard, 2001 http://logic.stanford.edu/kif/dpans.html.

* cited by examiner

METHOD AND SYSTEM FOR COLLABORATIVE ONTOLOGY MODELING

FIELD OF THE INVENTION

The present invention relates to a distributed ontology.

BACKGROUND OF THE INVENTION

Ontology is a philosophy of what exists. In computer science ontology is used to model entities of the real world and the relations between them, so as to create common dictionaries for their discussion. Basic concepts of ontology include (i) classes of instances/things, and (ii) relations between the classes, as described hereinbelow. Ontology provides a vocabulary for talling about things that exist.

Instances/Things

There are many kinds of "things" in the world. There are physical things like a car, person, boat, screw and transistor. There are other kinds of things which are not physically connected items or not even physical at all, but may nevertheless be defined. A company, for example, is a largely imaginative thing the only physical manifestation of which is its appearance in a list at a registrar of companies. A company may own and employ. It has a defined beginning and end to its life.

Other things can be more abstract such as the *Homo Sapiens* species, which is a concept that does not have a beginning and end as such even if its members do.

Ontological models are used to talk about "things." An important vocabulary tool is "relations" between things. An ontology model itself does not include the "things," but introduces class and relation symbols which can then be used as a vocabulary for talking about and classifying things.

Relations/Properties/Attributes

Relations, also referred to as properties, attributes, functions and slots, are specific associations of things with other things. Relations include:

Relations between things that are part of each other, for example, between a PC and its flat panel screen;

Relations between things that are related through a process such as the process of creating the things, for example, a book and its author;

Relations between things and their measures, for example, a thing and its weight.

Some relations also relate things to fundamental concepts such as natural numbers or strings of characters—for example, the value of a weight in kilograms, or the name of a person.

Relations play a dual role in ontology. On the one hand, individual things are referenced by way of properties, for example, a person by his name, or a book by its title and author. On the other hand, knowledge being shared is often a property of things, too. A thing can be specified by way of some of its properties, in order to query for the values of other of its properties.

Classes

Not all relations are relevant to all things. It is convenient to discuss the domain of a relation as a "class" of things, also referred to as a frame or, for end-user purposes, as a category. Often domains of several relations coincide, for example, the class Book is the domain for both Author and ISBN Number properties.

There is flexibility in the granularity to which classes are defined. Cars is a class. Fiat Cars can also be a class, with a restricted value of a manufacturer property. It may be unnecessary to address this class, however, since Fiat cars may not have special attributes of interest that are not common to other cars. In principle, one can define classes as granular as an individual car unit, although an objective of ontology is to define classes that have important attributes.

Abstract concepts such as measures, as well as media such as a body of water which cannot maintain its identity after coming into contact with other bodies of water, may be modeled as classes with a quantity relation mapping them to real numbers.

In a typical mathematical model, a basic ontology comprises:

A set C, the elements of which are called "class symbols;"
For each $c \in C$, a plain language definition of the class c;
A set R, the elements of which are called "relation symbols;"
For each $r \in R$:
  a plain language definition of r; and
  a list of class symbols called the domain of r, written
    $c_1 \times c_2 \times \ldots \times c_n$;
A set F, the elements of which are called "function symbols;"
For each $f \in F$:
  a plain language definition of f,
  a class symbol called the domain of f, and
  a class symbol called the co-domain of f, and
A binary transitive reflexive anti-symmetric relation, I, called the inheritance relation on $C \times C$.

In the ensuing discussion, the terms "class" and "class symbol" are used interchangeably, for purposes of convenience and clarity. Similarly, the terms "relation" and "relation symbol" are used interchangeably; and the terms "function" and "function symbol" are also used interchangeably. Further, the term attribute is used for a function.

It is apparent to those skilled in the art that if an ontology model is extended to include sets in a class, then a relation on $c \times d$ can also be considered as a function from c to sets in d. In this context, a relation may also be considered as a function or an attribute.

If $I(c_1, c_2)$ then $c_1$ is referred to as a subclass of $c_2$, and $c_2$ is referred to as a superclass of $c_1$. Also, $c_1$ is said to inherit from $c_2$.

A distinguished universal class "Being" is typically postulated to be a superclass of all classes in C.

Variations on an ontology model may include:

Omission of functions, which are in fact a special case of relations;

Restrictions of relations to binary relations, or of functions to unary functions, these being the most commonly used relations and functions;

The ability to specify more about properties of relations, such as multiplicity and invertibility.

The notion of a class symbol is conceptual, in that it describes a generic genus for an entire species such as Books, Cars, Companies and People. Specific instances of the species within the genus are referred to as "instances" of the class. Thus "Gone with the Wind" is an instance of a class for books, and "IBM" is an instance of a class for companies. Similarly, the notions of relation symbol and function symbol are conceptual, in that they serve as templates for actual relations and functions that operate on instances of classes.

Class symbols, relation symbols and function symbols are similar to object-oriented classes in computer programing, such as C++ classes. Classes, along with their members and field variables, defined within a header file, serve as templates for specific class instances used by a programmer. A compiler uses header files to allocate memory for, and enables a programmer to use instances of classes. Thus a header file can declare a rectangle class with members left, right, top and bottom. The declarations in the header file do not instantiate actual "rectangle objects," but serve as templates for rectangles instantiated in a program. Similarly, classes of an ontology serve as templates for instances thereof.

There is, however, a distinction between C++ classes and ontology classes. In programming, classes are a template and they are instantiated to create programming objects. In ontology, classes document common structure but the instances exist in the real world and are not created through the class. Also, there is no counterpart to the programming methods, only to the fields, which correspond to functions or attributes.

Ontology provides a vocabulary for speaking about instances, even before the instances themselves are identified. A class Book is used to say that an instance "is a Book." A function Author allows one to create clauses "author of" about an instance. A relation Siblings allows one to create statements "are siblings" about instances. Inheritance is used to say, for example, that "every Book is a PublishedWork". Thus all vocabulary appropriate to PublishedWork can be used for Book.

Once an ontology model is available to provide a vocabulary for talking about instances, the instances themselves can be fit into the vocabulary. For each class symbol, c, all instances which satisfy "is a c" are taken to be the set of instances of c, and this set is denoted B(c). Sets of instances are consistent with inheritance, so that $B(c_1) \subseteq B(c_2)$ whenever $c_1$ is a subclass of $c_2$. Relation symbols with domain $c_1 \times c_2 \times \ldots \times c_n$ correspond to relations on $B(c_1) \times B(c_2) \times \ldots \times B(c_n)$. Similarly, function symbols with domain $c_1$ and co-domain $c_2$ correspond to functions with domain $B(c_1)$ and co-domain $B(c_2)$. It is noted that if class $c_1$ inherits from class c, then every instance of $c_1$ is also an instance of c, and it is therefore known already at the ontology stage that the vocabulary of c is applicable to $c_1$.

Ontology enables creation of a model of multiple classes and a graph of relationships therebetween. When a class is defined, its attributes are described using handles to related classes. These can in turn be used to look up attributes of the related class, and thus attributes of attributes can be accessed to any depth.

Reference is now made to FIG. 1A, which is an illustration of enterprise knowledge relationships. FIG. 1A illustrates a typical information flow within an enterprise. An enterprise deals with dozens of data formats, including relational and XML formats. The same information such as an invoice must be picked up by different applications and departments.

Reference is now made to FIG. 1B, which is an illustration of graph-like relationships between ontology classes, corresponding to the relationships of FIG. 1A. Shown in FIG. 1B are classes for invoices 110, companies 120, products 130, components 140, measurements 150, credit ratings 160, people 170 and contact information 180. Each class is modeled individually, as well as their inter-relationships. When a specific invoice instance is described formally, users can derive required information from it. For example, a customer can retrieve the invoice electronically into a procurement system. A manufacturing department can view a bill of materials of products sold in order to replenish stock. A finance department can read a Dunn & Bradstreet credit rating of a customer in order to assess credit exposure.

In distinction to ontologies, XML Schema, or the earlier standard document type description (DTD), allow modeling of a single class by defining a syntax for documents that describe elements of that class. XWL documents have a tree structure that may include attributes, and attributes of attributes to a pre-determined depth. However, a user cannot look up attributes of attributes to a depth that is not explicitly included in the XML Schema. Thus if the invoice of FIG. 1 is modeled using an XML Schema intended for transfer of the invoice to a customer's procurement system, it is unlikely that manufacturing and finance departments will find the information they require inside an XML document for an invoice. If one were to model a full graph of relations between classes using self-referential XML Schema, such a Schema would be unusable, as no finite instance document would be valid according to the Schema.

It may thus be appreciated that an ontological model provides a more flexible basis for presenting data than does an XML Schema, particularly where the same data must be presented to multiple applications. The rigorous structure imposed by an XML Schema is likely to include only attributes of interest to the particular application for which the Schema was designed.

While XML Schema specifies a finite list of fields (attributes, attributes of attributes), an ontology is a comprehensive model of the world's entities by classes and the relations between them. As such, there are several barriers to the adoption of ontology as a basis for data standards, including:

No single party can model the whole world, so unlike a centralized XML Schema, a centralized ontology definition is impractical;

No ontology model will ever be complete or stable, so unlike XML Schema, a notion of backward compatible updates is required;

XML Schema and the table schema of the world's relational databases have considerable commercial traction, and thus an ontology model that cannot leverage existing XML Schema work and existing relational database schema work is unlikely to have commercial traction—the barrier being that the XML, relational database and ontology models are inherently incompatible.

Prior art ontology systems include the DARPA Agent Markup Language (DAML). Information about DAML is available on the Internet at http://www.daml.org. DAML includes hierarchical relations, and a "meta-level" for formally describing features of an ontology, such as author, name and subject. DAML includes a class of ontologies for describing its own ontologies. DAML includes a formal syntax for relations used to express ranges, domains and cardinality restrictions on domains and co-domains. DAML provides for a "maximum level" class and a "minimum level" class. "Things" is a class for everything, and is a superclass of all classes. "Nothing" is a class for the empty set, and is a subclass of all classes.

Another prior art system is the Resource Description Framework (RDF), developed by the World Wide Web Consortium. Information about RDF is available on the Internet at http://www.w3.org/RDF/. RDF is distributed and contains a grammar for subject-verb-object constructs, but does not contain an ontological model.

Another prior art system is the Knowledge Interchange Format (KIF). Information about KIF is available on the Internet at http://www.logic.stanford.edu/kif.

Another prior art system is the Ontology Inference Layer (OIL). Information about OIL is available on the Internet at http://www.ontoknowledge.org/oil/. OIL classes are defined "intentionally" rather than "extensionally." This means that OIL classes can be defined in terms of descriptions that specify the properties that objects must satisfy in order to belong to the class. Attributes of classes play a significant role in OIL. Similar to DAML, OIL includes hierarchical relations, and a "second meta-level" for formally describing features of an ontology, such as author, name and subject. Two types of classes are distinguished in OIL: "primitive" (by default) and "defined". For primitive OIL classes, their associated attributes are considered necessary but not sufficient for membership in the class. For example, if the primitive class Elephant is defined to be a sub-class of Animal with a constant stating that skin-colour must be grey, then all elephants must necessarily be animals with grey skin, but there may be grey-skinned animals that are not elephants. When a class is "defined" by attributes, its definition is taken be both necessary and sufficient. For example, if the defined class Carnivores is defined to be a sub-class of Animal with the constraint stating that it eats meat, then every carnivore is necessarily a meat eating animal, and every meat eating animal is a carnivore. Intersections and unions of classes are defined in OIL using what are termed class-expressions, so that, for example, Meat AND Fish defines the class of things that are both meat and fish, and NOT Fish can define all things which are not fish.

A general reference on ontology systems is Sowa, John F., Knowledge Representation, Brooks/Cole, Pacific Grove, Calif., 2000.

SUMMARY OF THE INVENTION

The present invention provides for a distributed ontology, built up from individual ontology efforts distributed over the web, which in aggregate comprise a global ontology. The present invention enables cross-referencing of definitions, so that a relation defined in one place may have a domain that uses one or more classes defined in one or more other places. Similarly, a class defined in one place may have sub-classes defined in other places.

The present invention provides the ability to build up an ontology in a collaborative way. The physical distribution of different parts of the ontology is arbitrary, and the different parts may reside on the same physical computer or on different physical computers.

A feature of the present invention is the ability to update ontology definitions, by controlling changes made to an ontology so as to ensure backward compatibility. This ensures that a vocabulary that is valid within the framework of a current ontology will continue to be valid with respect to future evolutions of the ontology. Preferably, the present invention uses rules for allowing only a "safe" set of edits to be performed on an ontology.

Thus an ontology may be updated and yet maintain backward compatibility by adding new classes and relations, by adding superclass/subclass inheritance relations, and by extending existing relations and functions. The update feature of the present invention enables enrichment of an ontology without disrupting the available vocabulary. A relation may be extended by enlarging one or more of the classes $c_1$ from its domain $c_1 \times c_2 \times \ldots \times c_n$ to superclasses thereof. A function may be extended by enlarging its domain from a class to a superclass thereof, and/or by reducing its co-domain from a class to a subclass thereof. For example, if the domain of a function Author is extended from a class Books to a larger class Content, the vocabulary "author of the book" remains valid. Similarly, if the co-domain of the function Author is reduced from a class Living Beings to People, the vocabulary "father of the book's author" remains valid.

The present invention further includes the ability to derive XML Schema for particular classes from an ontology, with arbitrary levels of detail (i.e., export to XML Schema). Fundamentally an ontology can be represented as a directed graph whose nodes represent classes and whose edges represent relations. For example, the relation "author of a book" may be an edge going from a class Books to a class People. Such a graph may have closed paths within it, since attributes of classes may refer back to the classes at some level. For example, a book has an author, which is a person, and a person has publications, which are books. An XML Schema, on the other hand, corresponds to a tree structure. The present invention enables derivation of a tree structure for an XML Schema from a graph structure for an ontology.

Similarly, the present invention includes the ability to glean ontological information and to publish class and relation definitions from an XML Schema and from the table schema of relational databases (i.e., import from XML Schema and relational databases), and from the class hierarchy of an object-oriented application programming interface.

The present invention also includes the ability to create a correspondence, or mapping, between an ontology and an existing XML Schema or relational table schema. Preferably, the mapping identifies certain types in the XML Schema or relational table schema with certain classes in the ontology.

More generally, the present invention describes a format that can be derived from an ontology, referred to as a "View." A View is preferably associated with a specific class in an ontology, and represents a collection of attributes of the class, where the collection of attributes is appropriate for describing or referencing instances of the class in a given situation.

Using the present invention, an ontology serves as a master vocabulary or central dictionary, where other data standards each correspond to a subset. As such, an ontology can be used to guide the creation of transcodings, or mappings, between any of the other standards, by transcoding in and out of the ontology. This is more efficient than mapping each pair as needed, which is error prone and may have to be done n squared times where n is the number of formats.

The present invention includes a novel user interface for representing elements of an ontology, including inter alia classes, relations, functions and instances of classes. Preferably, the user interface of the present invention uses icons to represent classes and instances of classes. In a preferred embodiment, the present invention enables navigating iteratively from an icon representing an instance to an icon representing an attribute of the instance, whereby a window for a class or an instance of a class contains a list of icons for classes corresponding to the attributes thereof. Such a user interface enables one to navigate an ontology through any number of levels.

There is thus provided in accordance with a preferred embodiment of the present invention a distributed ontology system including a central computer comprising a global ontology directory, a plurality of ontology server computers, each including a repository of class and relation definitions, and a server for responding to queries relating to class and relation definitions in the repository, and a computer network connecting the central computer with the plurality of ontology server computers.

There is further provided in accordance with a preferred embodiment of the present invention an ontology system including a repository of class and relation definitions, and a server for responding to queries relating to class and relation definitions in the repository; and an XML embedder for embedding an XML Schema within the repository by identifying class and relation definitions implicit in the XML Schema.

There is yet further provided in accordance with a preferred embodiment of the present invention an ontology system including a repository of class and relation definitions, a server for responding to queries relating to class and relation definitions in the repository, and an XML embedder for embedding an XML Schema within the repository by converting the XML Schema into class and relation definitions.

There is additionally provided in accordance with a preferred embodiment of the present invention an ontology system including a repository of class and relation definitions, a server for responding to queries relating to class and relation definitions in the repository, and an XML generator for generating an XML Schema from class and relation definitions.

There is moreover provided in accordance with a preferred embodiment of the present invention a distributed ontology method including managing a plurality of repositories of class and relation definitions, managing a global ontology directory, and responding to queries relating to class and relation definitions in at least one repository.

There is further provided in accordance with a preferred embodiment of the present invention an ontology method including managing a repository of class and relation definitions, responding to queries relating to class and relation definitions in the repository, and embedding an XML Schema within the repository by identifying class and relation definitions implicit in the XML Schema.

There is yet further provided in accordance with a preferred embodiment of the present invention an ontology method including managing a repository of class and relation definitions, responding to queries relating to class and relation definitions in the repository, and embedding an XML Schema within the repository by converting the XML Schema into class and relation definitions.

There is additionally provided in accordance with a preferred embodiment of the present invention an ontology method including managing a repository of class and relation definitions, responding to queries relating to class and relation definitions in the repository, and generating an XML Schema from class and relation definitions.

There is moreover provided in accordance with a preferred embodiment of the present invention an ontology system including a global ontology directory, a plurality of repositories of class and relation definitions, and a server for responding to queries relating to class and relation definitions in the repositories.

The following definitions are employed throughout the specification and claims.

1. Class symbol—a symbol that is a placeholder for a class; e.g., a symbol for a class Books.
2. Class—a set of real world entities whose elements have a common classification; e.g., a class called Books is the set of all books in existence).
3. Relation symbol—a symbol that is a placeholder for a relation; e.g., a symbol for a relation called Author.
4. Relation—as used in mathematics, a subset of a cross product of classes; i.e., a set of tuples (singleton, pair, triplet or, more generally, "tuple") of instances from one or more classes that obey a relationship; e.g., a relation called Author is the list of all pairs (book, person) where the person is an author of the book.
5. Function symbol—a symbol that is a placeholder for a function; e.g., a symbol for a function called Title.
6. Function—an operation that accepts as input an instance of a class and produces as output an instance of the same or another class; e.g., the function Title accepts as input a book and produces as output a text string; namely, the title of the book.
7. Domain—a class whose elements are inputs for a function or relation; e.g., the domain for a function called Title is a class called Books.
8. Co-domain—a class whose elements are used as outputs for a function; e.g., the co-domain for a function called Title is a class called Text Strings.
9. Instance—an element of a class; e.g., Gone with the Wind is an instance of Books.
10. Instance document—an XML term for a document formatted according to an XML Schema. As used in the invention, an XML Schema is associated with a class and its instance documents are associated with instances of the class.
11. Attribute Value—a function value; i.e., an instance that is the output of a function; e.g., an attribute value for Title is the text string "Gone with the Wind".
12. Subclass—a class that is a subset of another class; e.g., a class called Sherlock Holmes Novels is a subclass of a class called Books.
13. Superclass—a class that is a superset of another class; e.g., a class called Books is a superclass of a class called Sherlock Holmes Novels.
14. Inheritance—the binary relationship on the set of all classes, of one class being a subclass of another class.
15. XML Schema—a set of rules governing the syntax of XML documents.
16. Relational database—a linked collection of tables, each having one or more fields, in which fields of a table may themselves point to other tables.

BRIEF DESCRIPTION OF THE DRAWINGS

The present invention will be more fully understood and appreciated from the following detailed description, taken in conjunction with the drawings in which.

LIST OF APPENDICES

Appendix A is a simplified listing of example ontologies, in accordance with a preferred embodiment of the present invention; and Appendix B is a simplified listing of an XML Schema for an ontology, in accordance with a preferred embodiment of the present invention.

DETAILED DESCRIPTION OF A PREFERRED EMBODIMENT

The present invention relates to a distributed approach to ontology. Recognizing that one player cannot model an entire world, the present invention enables an ontology to be built up from distributed patchworks of ontology efforts with different owners, which nonetheless in aggregate represent a single global ontology.

Managing a distributed ontology requires solutions to problems that do not arise with single owner ontologies. As described in detail hereinbelow, such problems and the solutions provided by the present invention include:

Problem: Redundancy

Description: More than one player may provide alternative models for the same part of the real world.

Solution: The distributed ontology of the present invention allows for such alternatives to co-exist, and provides tools for parties to negotiate the ontology to use and for providing mappings between alternative models.

Problem: Reliability

Description: As a global ontology is an open ontology, it may comprise a web of ontological elements originating from owners with different credentials.

Solution: The distributed ontology of the present invention allows for evaluation and filtering of ontologies based on credentials of their owners.

Problem: Evolvability

Description: The physical world, its classes of entities and the relationships between them are constantly changing.

Solution: The distributed ontology of the present invention includes tools for extending an ontology while maintaining backward compatibility.

Problem: Compliance with Standards

Description: Existing documents and data, such as XML Schema and relational database schema, already contain ontological information, although they do not obey a formal ontological model.

Solution: The distributed ontology of the present invention builds upon such existing documents and data. It provides for importing XML Schema and relational database schema into an ontology model, and for exporting XML Schema and relational database schema from an ontology model.

Problem: Tools

Description: In order to make a distributed ontology effective, there must be a platform of tools making it easy to build and use a global ontology via the web.

Solution: The present invention provides a platform of such tools.

Figure 2:
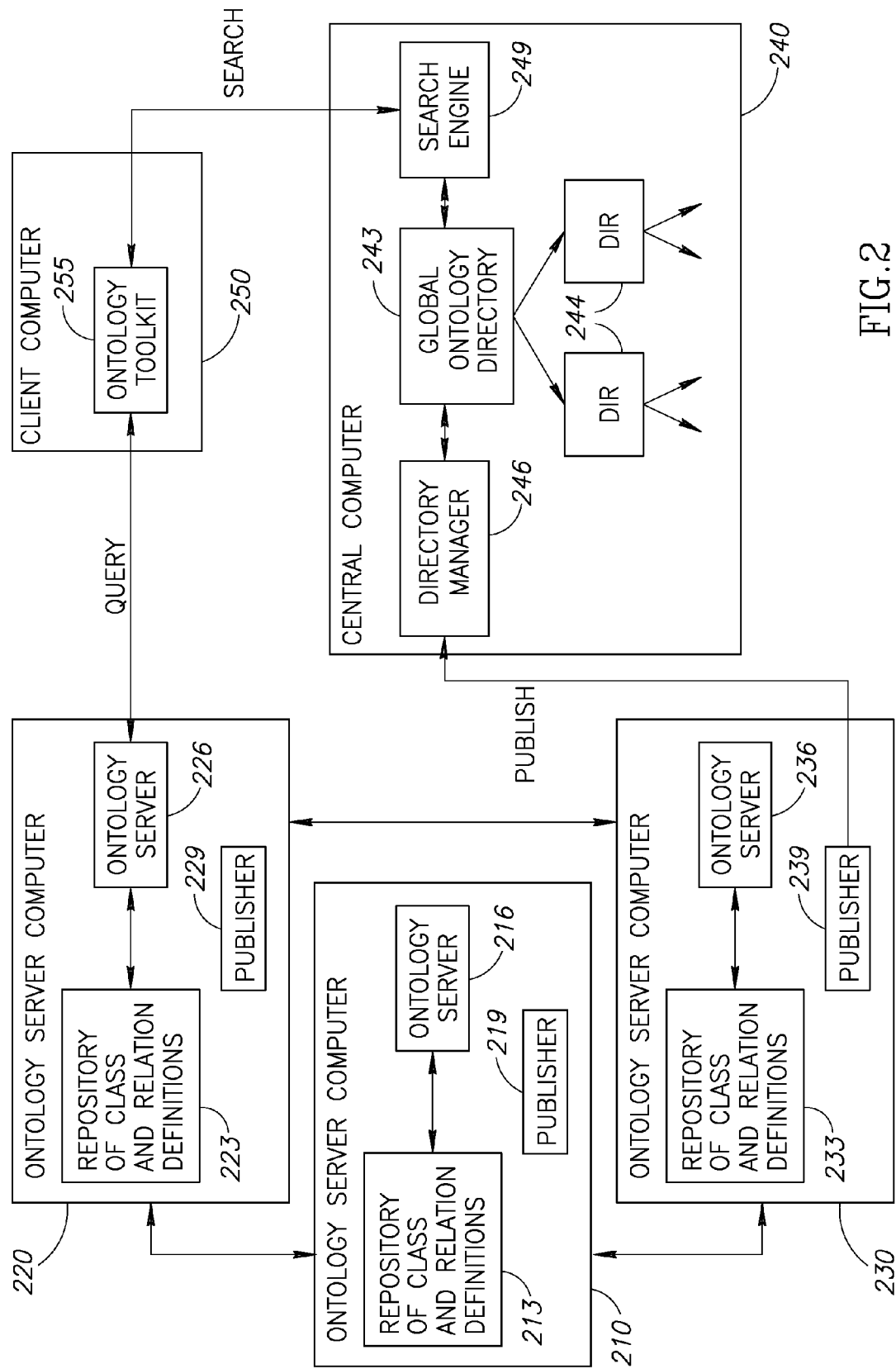
FIG. 2 is a simplified illustration of a distributed ontology system in accordance with a preferred embodiment of the present invention.

Reference is now made to FIG. 2, which is a simplified illustration of a distributed ontology system in accordance with a preferred embodiment of the present invention. The system shown in FIG. 2 enables multiple parties to publish separate definitions of classes and relations on the web, and update them from time to time. Moreover the relations can use classes from different owners as domains, thereby creating a web.

Shown in FIG. 2 are three ontology server computers, 210, 220 and 230. Each ontology server computer maintains its own ontology in a repository of class and relation definitions, labeled 213, 223 and 233, respectively. Ontology server computers 210, 220 and 230 are shown interconnected by dotted lines, indicating that the server computers may not communicate with each other, but the class and relation definitions in any one of the repositories can contain references to direct a client to the other repositories.

An ontology server may be realized by way of a standard web server, serving the ontology repository using a syntax similar to that documented using XML Schema in Appendix B hereinbelow.

Each repository is made accessible by a server, labeled 216, 226 and 236, respectively. Preferably, each ontology server computer further includes a publisher, labeled 219, 229 and 239, respectively, through which it can publish class and relation definitions in its repository to a global ontology directory 243 residing in a central computer 240, and thereby share them with others. Preferably, ontology directory 243 maintains a master catalogue with links to classes and relations in the various ontologies present in repositories 213, 223 and 233. The master catalogue in global ontology directory 243 may be distributed hierarchically among multiple levels of sub-directories 244. Sub-directories 244 may reside within central computer 243, or alternatively, they may reside in separate computers.

Global ontology directory 243 is managed by a directory manager 246. As shown in FIG. 2, ontology server computer 230 preferably publishes its ontology to global ontology directory 243 through directory manager 246. Upon doing so, global ontology directory 243 modifies its catalogue so as to acknowledge the classes and relations residing on ontology server 230.

Ontology server computers 210, 220 and 230 may be physically distinct computers, or may be the same physical computer. In fact, ontology server computers 210, 220 and 230 may coincide with central computer 240.

Global ontology directory 243 may be realized by:
A standard web search engine that indexes classes by keyword;
A Java/C++ program that recreates an ontology web centrally using objects; or
A relational database with tables for classes, relations, functions and inheritance that list (i) domains for relations, (ii) domains and co-domains for functions, and (iii) subclasses and superclasses for inheritance. Preferably relations are indexed by name, domain and subdomain; and inheritance is indexed by subclasses and superclasses.

Also shown in FIG. 2 is a toolkit 255 for enabling a client computer 250 to use the distributed ontology of the present invention. Toolkit 255 conducts searches of global ontology directory 243 for specific ontological information. After locating an ontology server computer, such as ontology server computer 220, containing the requested information, client computer 250 uses toolkit 255 to query repository 223 and obtain detailed information about classes of interest.

Figure 3:
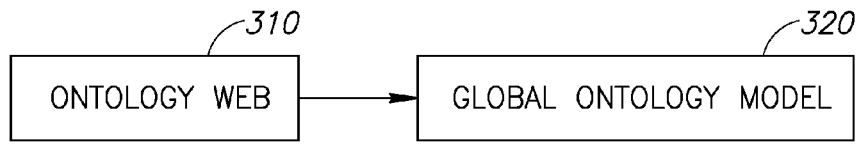
FIG. 3 is a simplified illustration of a mapping from a web of distributed class and relation definitions to a global ontology model, in accordance with a preferred embodiment of the present invention.

As may be appreciated from FIG. 2, the present invention extends an abstract ontology model to a model for a distributed ontology. Reference is now made to FIG. 3, which is a simplified illustration of a mapping from a web of distributed class and relation definitions to a global ontology model. The distributed ontology allows an ontology model b be built up from an ontology web 310 of distributed sets of class and relation definitions. Taken as a whole, the distributed sets of class and relation definitions define a global ontology model 320. The mapping illustrated in FIG. 3 is referred to as an ontology web semantic mapping, as it helps give meaning to the ontology web.

The data repositories of an ontology web may be linked to one another. Thus a class defined within a specific repository may be a subclass of a referenced class defined within a different repository. Similarly, a function defined within a specific repository may have as its domain a referenced class defined within a different repository, and as its co-domain a referenced class defined within yet another repository. According to the present invention, such referencing can occur whether the repositories reside on one computer or whether they are physically distributed.

The present invention preferably uses a "class definition" as a common way of describing a class. A class definition is a document or segment of a document with the following elements:

Compulsory:
A natural language description delineating what comprise the elements of the class.

Optional:
A natural language name/label.
A set of class references representing superclasses.
  For each superclass, a list of restrictions on relations with that superclass as domain.
A set of class references representing subclasses.
Restrictions (e.g., classes which this class is disjoint from).
A URL of an icon representing the class.

A feature of the present invention is the ability to update ontology definitions, by controlling changes made to an ontology so as to ensure backward compatibility. This ensures that a vocabulary that is valid within the framework of a current ontology will continue to be valid with respect to future evolutions of the ontology. Preferably, the present invention uses rules for allowing only a "safe" set of edits to be performed on an ontology.

Thus an ontology may be updated and yet maintain backward compatibility by adding new classes and relations, by adding superclass/subclass inheritance relations, and by extending existing relations and functions. The update feature of the present invention enables enrichment of an ontology without disrupting the available vocabulary.

A class definition A is an "update" of a class definition B if the set of superclasses and the set of subclasses in A respectively contain the set of superclasses and the set of subclasses in B, and the description and label are unchanged. As mentioned hereinabove, an update mechanism enables an ontology to dynamically evolve and expand while maintaining backward compatibility.

Specifically, class definitions may be updated so as to include new superclass/subclass relations, and new class and relation definitions may be added to an ontology, without breaking backward compatibility.

A "class server" is a device that can transmit a class definition on demand, and which is preferably committed to not change the class definition it transmits other than by way of update. The class server allows a definition to be available over time and to be updated while still referring to the same class of real world items. A class server preferably indicates class server metadata, including inter alia:
Promise of reliability (e.g., in terms of % uptime);
Promise of consistency, including:
  No change; and
  Updates allowed;
Author,
Version number,
Date of last change;
Accessibility and pricing information; and
Digital signature on the above information, for authentication purposes, to ensure that an author committing to this behavior is identifiable and remains the same when the class definition is updated.

A "class reference" is a pointer to a class definition. Preferably, there are at least two types of class references: (i) a local class reference, which points to a class definition within the same document in which the reference appears, and (ii) a global class reference, which contains a URL of a class server and a reference to a class within a document at the URL.

Similar to a class definition, the present invention preferably uses a "relation definition" as a common way of describing a relation. A relation definition is a document or segment of a document with the following elements:

Compulsory.
A natural language description describing the meaning of the relation.
A list of class references called the domain.

Optional:
A natural language name/label.
A list of restrictions on the relation (e.g., whether it is a function, the cardinality of the relation)
A list of restrictions on the relation when limited to some subclass of the domain.

"Function definitions" are defined similar to relation definitions, when functions are distinguished from relations as in the ontology model described hereinabove.

A relation definition Q is an "update" of a relation definition R if the classes comprising the domain of Q are superclasses of the respective classes comprising the domain of R and, within the domain of Q, Q contains R. As pointed out above, an update mechanism enables an ontology to dynamically evolve and expand while maintaining backward compatibility.

Similarly, a function F is an "update" of a function G if (i) the domain of F is a superclass of the domain of G; and (ii) the co-domain of F is a subclass of the co-domain of G.

The concepts of a "relation server" and a "relation reference" are defined analogously to those of a class server and a class reference.

Given a web of class and relation servers, these at any one time represent a global ontology model. The ontology web semantic mapping defined hereinabove with reference to FIG. 3 is built up as follows:

The set of classes is the set of valid class definitions available from class servers at any one time;
The set of relations is the set of valid relation definitions available from relation servers at any one time; and
The inheritance relation includes all pairs of classes $(c_1, c_2)$ such that either (i) $c_1$ lists $c_2$ as a subclass; or (ii) $c_2$ lists $c_1$ as a superclass.

Preferably, the inheritance relation of $c_1$ and $c_2$ is not listed in either class definition, but rather in a separate inheritance document that contains references to a subclass and to a superclass. In this way, a third party can publish an inheritance relation between two classes on the web. Such an inheritance document enables other third parties to note inheritance between two different classes.

In a preferred embodiment the present invention includes a syntax for the class and relation concepts described hereinabove, as described hereinbelow with reference to Appendix A.

Preferably, the present invention allows documents that include ontological information to be implicitly embedded within an ontology web, including, for example, XML Schema, relational database schema, RDF schema and even simple text documents describing a class. Standards that are embodied in such documents can be included within the ontology web of the present invention. In a preferred embodiment of the present invention, such documents can be posted directly within an ontology repository, and the class and relation definitions implicit therein are identified In an alternate embodiment of the present invention, such documents are converted to a specific format suited for ontologies.

Figure 4A:
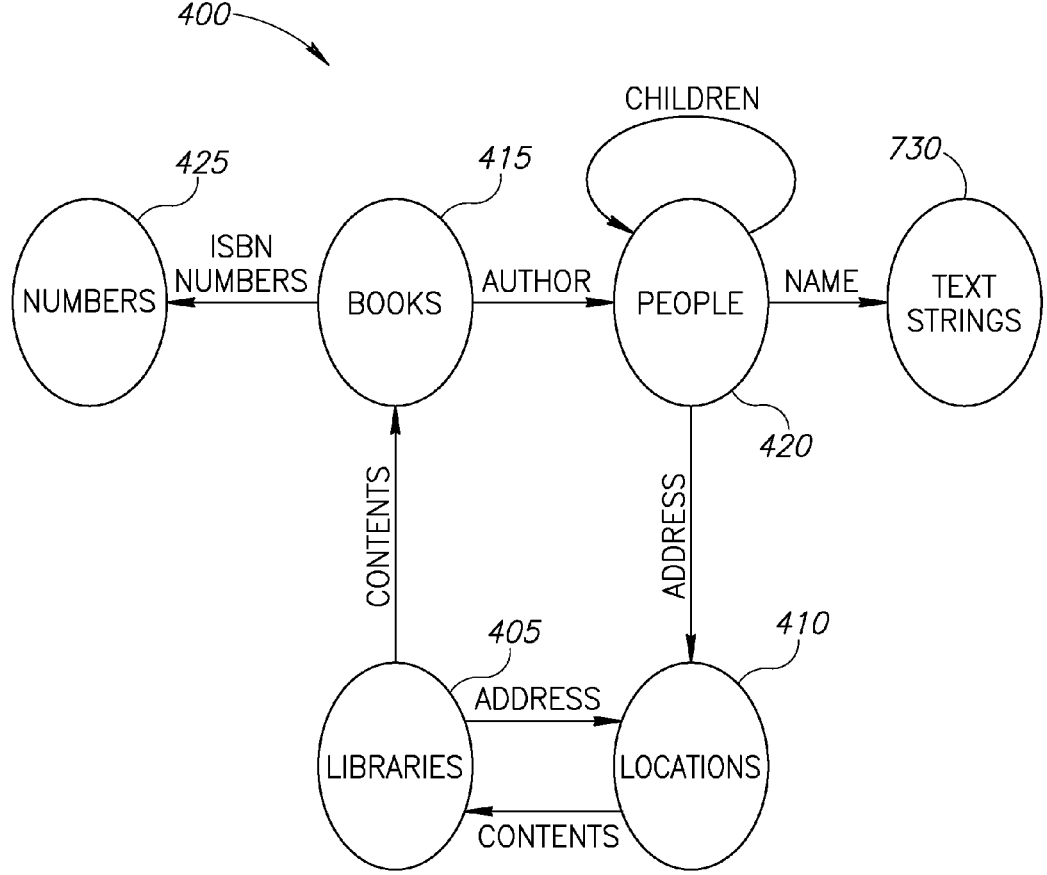
FIGS. 4A and 4B are simplified illustrations of export from an ontology to an XML Schema, in accordance with a preferred embodiment of the present invention.
Figure 4C:
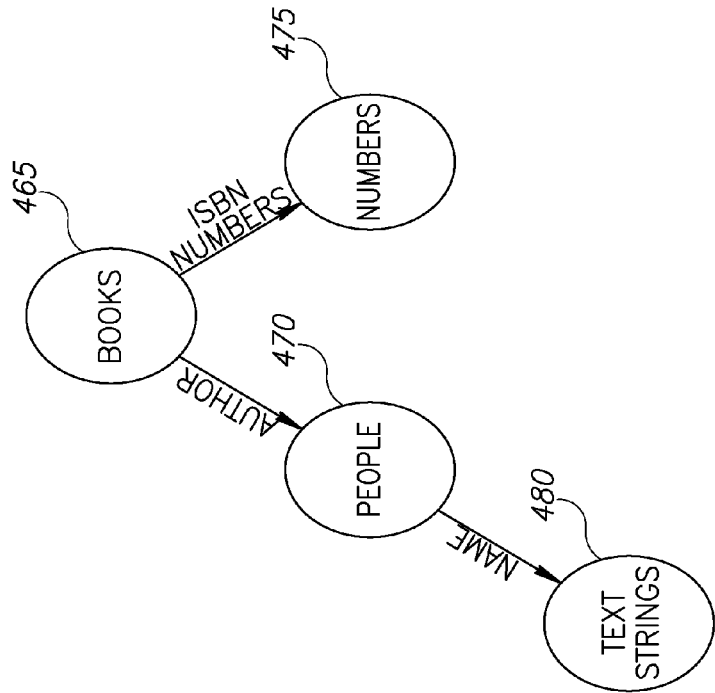
FIG. 4C is a simplified illustration of a View, in accordance with a preferred embodiment of the present invention.
Figure 4B:
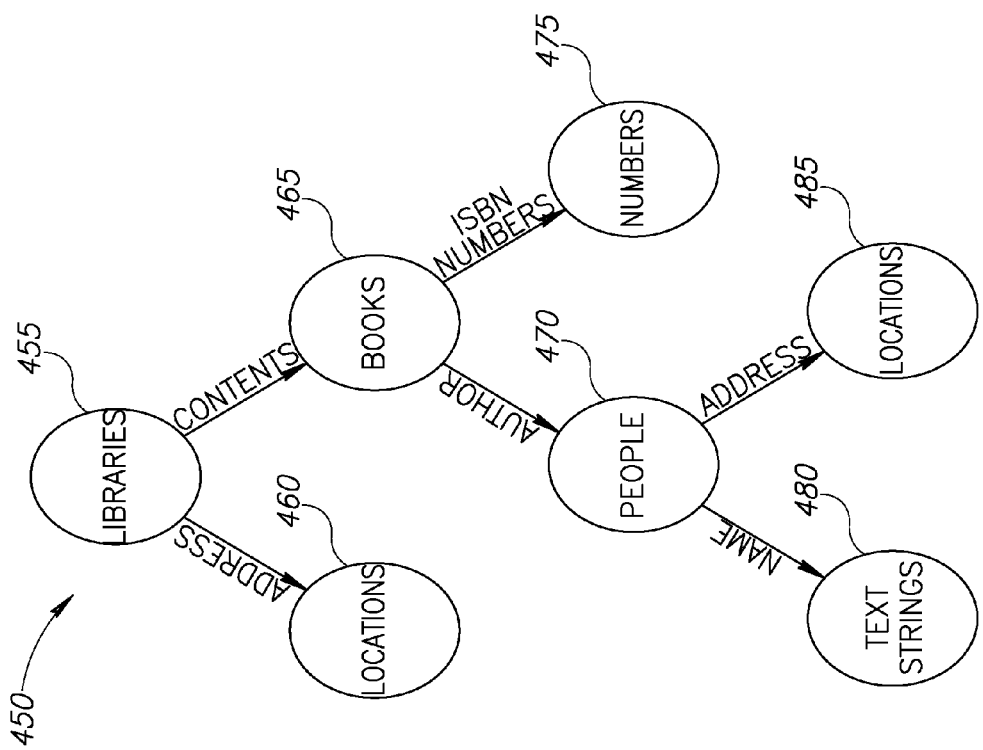

Preferably, the present invention also allows ontological information to be exported to XML Schema, relational databases, RDF schema and simple text documents. Reference is now made to FIGS. 4A and 4B, which are simplified illustrations of export from an ontology to an XML Schema, in accordance with a preferred embodiment of the present invention. Fundamentally, the classes and relations within an ontology can be depicted as a directed graph, with nodes corresponding to classes and edges corresponding to relations. Such a graph can have closed paths, since properties of a class can lead back to the same class.

Shown in FIG. 4A is a directed graph 400, containing a class 405 for Libraries. Libraries are indicated with two properties; namely, an Address and Contents. The edge for Address points from Libraries to a class 410 for Locations, meaning that the address of a library is a location. The edge for Contents points from Libraries to a class 415 for Books, meaning that the contents of a library are books. Similarly, Books are indicated as having two properties; namely, an Author and an ISBN Number. The edge for Author points from Books to a class 420 for People, meaning that the author of a book is one or more people. The edge for ISBN Number points from Books to a class 425 for Numbers, meaning that the ISBN number of a book is a number. Class 425 for Numbers is a fundamental class; i.e., it corresponds to a fundamental concept.

Similarly, People are indicated as having three properties; namely, Name, Address and Children. The edge for Name points from People to a class 430 for Text Strings, meaning that the name of a person is a text string. Class 430 for Text Strings is also a fundamental class. The edge for Address points from People to class 410 for Locations, meaning that the address of a person is a location. The edge for Children points from People back to People, meaning that the children of a person are zero or more people. Similarly, Locations are indicated as having a property of Contents. The edge for Contents points from Locations to Libraries, meaning that the contents of a location include zero or more Libraries.

Fundamentally, the tags and attributes within an XML Schema can be depicted as a tree. In order to extract an XML Schema from an ontology, it is therefore necessary to map the directed graph structure of an ontology into the tree structure of an XML Schema.

Shown in FIG. 4B is a tree 450 that is extracted from graph 400 (FIG. 4A), for an XML Schema for Libraries. Tree 450 has a root 455 for Libraries, corresponding to node 405 in graph 400. Root note 455 has two child nodes; namely, node 460 for Locations, corresponding to node 410 in graph 400, and node 465 for Books, corresponding to node 415 in graph 400. In turn node 465 has two child nodes; namely, node 470 for People, corresponding to node 420 in graph 400, and node 475 for Numbers, corresponding to node 425 in graph 400. Finally, node 470 has two child nodes; namely, node 480 for Text Strings, corresponding to node 430 in graph 400, and node 485 for Locations, corresponding to node 410 in graph 400.

It is noted that tree 450 could be continued indefinitely, since Locations can contain Libraries as a child. In order to determine how far tree 450 should extend, preferably a user assists the process of exporting tree 450 from graph 400. The user can choose which relations are to be included in tree 450 and which are not to be included. In tree 450, for example, the user has decided not to include Libraries as a child of Locations in nodes 460 and 485.

In a preferred embodiment of the present invention, an Explorer-type navigational tool is used by a user to select the relations that are to be included in tree 450. A list of classes is displayed, each of which can be expanded an additional level to view the relations thereof. The user selects those relations he chooses to incorporate in the XML Schema.

It is apparent from FIG. 4B, that trees for XML Schema can be derived from one another, so that if an XML Schema for People has already been defined, it may be embedded as a sub-tree in an XML Schema for Libraries by using it instead of node 470.

Tree 450 can be directly converted into an XML document with structure:

```
<Library>
    <Address>
        Location of library
    </Address>
    <Contents>
        Name of book
        <Author>
            <Name>
                Name of author(s)
            </Name>
            <Address>
```

```
               -continued
              Address(es) of author(s)
           </Address>
         </Author>
         <ISBN Number>
             ISBN number of book
         </ISBN Number>
       </Contents>
     </Library>
```

Although one can derive an XML Schema corresponding to tree 450, for purposes of clarification a sample XML instance document according to such a Schema has been described above, rather than the formal XML Schema itself. It may be appreciated by those skilled in the art that XML Schema includes DVD and other conventional schematic formalisms.

An XML Schema is but one particular syntax for a more abstract format that can be derived from an ontology, referred to as a "View." A View is preferably associated with a specific class in an ontology, and represents a collection of attributes of the class, where the collection of attributes is appropriate for describing or referencing instances of the class in a given situation. It may be appreciated that one class can be associated with several Views, which can be used to describe the class instances in different applications.

In one embodiment of the present invention, a view for a class, c, is implemented by listing functions of the class, c. A more flexible embodiment of the present invention allows the inclusion of composed functions with domain c in order to reproduce a full tree structure, such as tree 450, which includes composed functions such as the ISBN Number of the Content, or the Author of the Content, or the Name of the Author of the Content. The term "composed functions" refers to conventional function composition, wherein a second function whose domain is a sub-class of the co-domain of a first function is applied to the result of the first function.

In a preferred embodiment of the present invention Views are defined recursively as follows. Each View of a class includes a list of functions with domain c and, for each function, a view of its co-domain. Reference is now made to FIG. 4C, which is a simplified illustration of a View, in accordance with a preferred embodiment of the present invention. FIG. 4C shows a view for Books, which can be used to create a View for Libraries in FIG. 4B. I.e., a View for Libraries includes the function Contents, and uses the View in FIG. 4C for displaying the View of the content.

A typical ontology model uses standard abstract fundamental classes such as integers, characters and character strings, which are, in accordance with a preferred embodiment of the present invention, provided together with appropriate fundamental views. E.g., a fundamental class Integers may be provided with a View such as decimal representation View or Roman numeral View, which are implemented directly in software rather than being defined recursively in terms of other views. Such fundamental views are used to terminate recursive definitions of other views.

It may be appreciated by those skilled in the art that a view corresponds to an xsd:complexType element in an XML Schema.

Preferably, the distributed ontology of the present invention includes a model for authorship. Reasons for wanting to know about the author/publisher of a class or relation include:

Is this a well known author (such as an industry association) whose definition is likely to be adopted as a standard?

Is the definition likely to be clearly worded?

Is the class/relation definition likely to be kept stable?

Is the class/relation server likely to be kept reliably on-line?

Where is the ontology physically distributed?

A preferred approach to authorship meta-data is that each class and relation definition has associated therewith The name of an entity who is responsible for authoring the document;

A digital signature of the entity on the class/relation definition document, using one of the well known standards for digital signature such as the standards for digital signature on an XML document;

A certificate or chain of certificates signed by a well known certification authority associating the digital signature with the author; and Other authorship or meta-data used in the art (e.g., as in the OIL model).

Preferably an author also signs a record of a URL in order to verify that he is responsible for the up-time of the URL. Otherwise, anyone could copy a signed document and present it from a nonreliable web server, which would not provide a suitable URL for referencing the class.

In a preferred embodiment, the present invention enables a user to list authors that he trusts. Moreover, in a preferred embodiment, the present invention supports user groups on the web maintained by a user group owner. A user can describe a "trust policy" by listing groups that he trusts. Preferably, groups are recursive, so that a group may contain another group by inclusion.

It may be appreciated that the filtering of ontologies based on a trust policy leads to the formation of sub-webs. A sub-web includes (i) class definitions authored by approved authors; and (ii) relation definitions authored by approved authors and for which classes comprising the domains are authored by approved authors; (iii) function definitions authored by approved authors and for which classes comprising the domains and co-domains are authored by approved authors; and (iv) inheritance, where the subclass, superclass and inheritance are all by approved authors. Such an ontology sub-web is available to a user based upon his trust policy. The toolkit described hereinbelow ensures that only a user's trusted sub-web is transparent to him.

In a preferred embodiment, the present invention includes an authoring tool, which is a set of graphical tools for creating class and relation definitions. The authoring tool allows an ontology web to be viewed and new classes and relations added thereto.

In a preferred embodiment, the present invention includes an ontology web toolkit that provides interfaces to class and relation servers. Preferably, the toolkit includes an application programming interface (API) for finding classes and accessing them, including:

Finding a class by specifying any of the following or combinations thereof:
  Keywords from definition
  Superclass
  Subclass
  Author, or an entity along the certification chain
Given a class, access methods for:
  Superclasses
  Subclasses
  Relations with this domain
  Definition Preferably, the API includes similar interfaces for finding and accessing relations.

The present invention includes a global ontology directory, such as ontology directory 243 (FIG. 2). Preferably, new class and relation definitions have their URLs submitted to the global ontology directory in order to become part of the ontology web. In a preferred embodiment of the present invention, global ontology directory 243 maintains the following indices using a database table or search engine technology:

A list of class definitions indexed by keywords in their descriptions;
A list of class definitions indexed by superclass references;
A list of class definitions indexed by subclass references;
A list of relation definitions indexed by keywords in their descriptions;
A list of relation definitions by each domain class reference;
A list of function definitions indexed by keywords in their descriptions; and
A list of function definitions by each domain and codomain class reference.

In a preferred embodiment of the present invention, when listing class definitions indexed by superclass or subclass references, classes are included in such a list irrespective of whether or not the class declares the indexed superclass or subclass to be a superclass or subclass thereof, respectively; or whether or not the indexed superclass or subclass declare the class to be a subclass or superclass thereof, respectively.

In a preferred embodiment the present invention also includes an ontology software library, or toolkit, including an application programming interface (API) for application users of the ontology, enabling them to (i) locate published class and relation definitions; (ii) traverse a web of class and relation definitions, (iii) evaluate reliability of ontologies based on authorship and authorship of dependents, and (iv) negotiate common ontologies.

Such an API may be implemented directly by those skilled in the art by using remote procedure calls, such as remote method invocation (RMI), to call corresponding functions/methods on directories and servers, or by requesting ontological information from a relevant server, for example, by using standard HTTP, and then parsing it using, for example, a DOM or SAX interface XML parser to glean necessary information.

Recognizing that more than one player may provide alternative models for the same part of the real world, the present invention preferably includes an "equivalence" relation, similar to the inheritance relation, to identify classes which are equivalent. Two classes are equivalent if there is a one-to-one onto function with one class as its domain and the other class as its range. In particular, if two classes are equivalent, then instances of the first class are equivalent to instances of the second class.

Implementation Details

Figure 5:
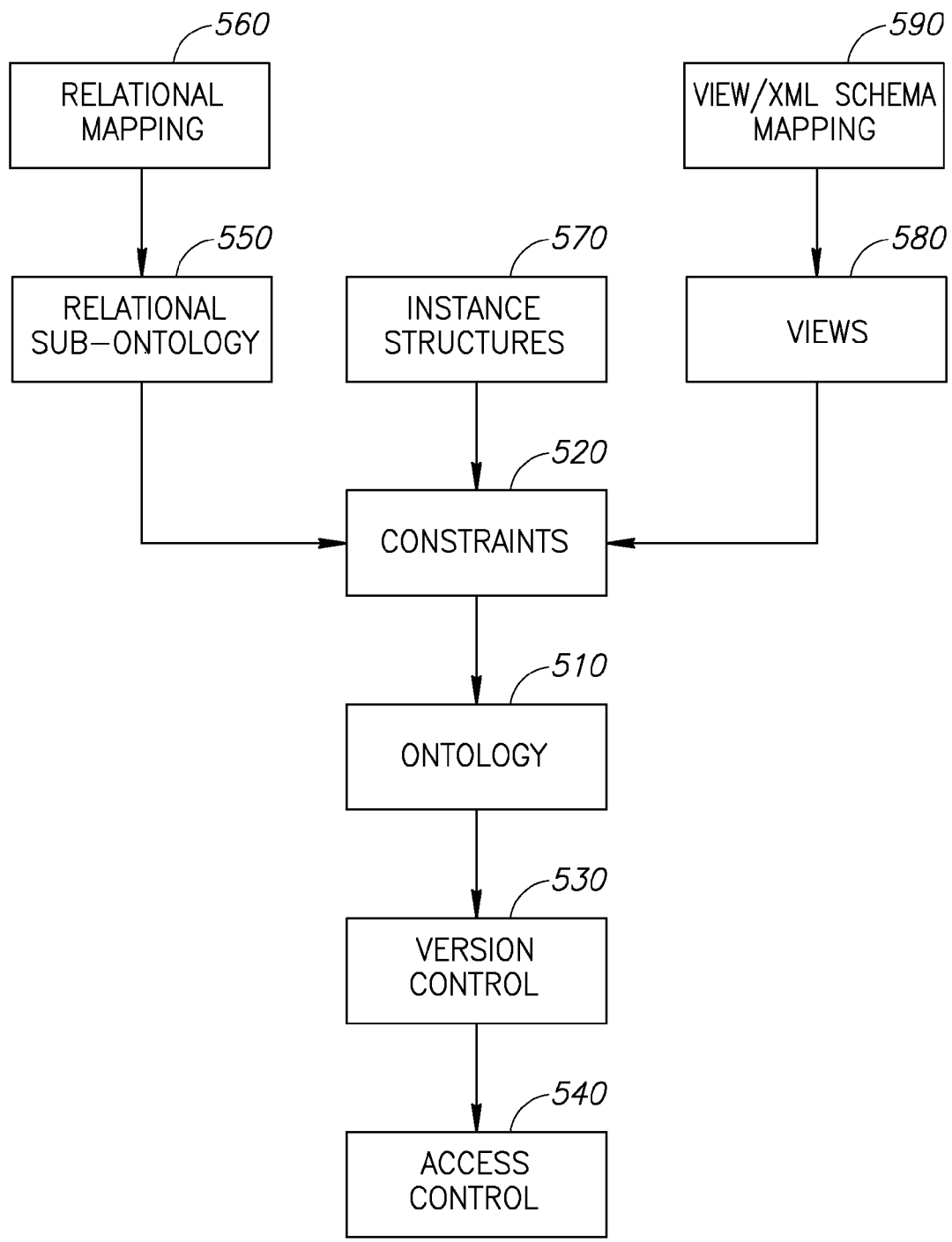
FIG. 5 is a simplified block diagram of components of a comprehensive ontology system, in accordance with a preferred embodiment of the present invention.

Reference is now made to FIG. 5, which is a simplified block diagram of components of a comprehensive ontology system, in accordance with a preferred embodiment of the present invention. Shown in FIG. 5 is an ontology layer 510. Ontologies are described hereinabove.

Also shown in FIG. 5 is a constraint layer 520. Constraint layer 520 is an extension to ontology layer 510 that allows more advanced information about a model of the world, beyond just vocabulary, to be captured.

Typed first order logic can be used to provide a very general constraint model. Classes provide logical types and inheritance represents sub-typing. Relations are logical predicates, and functions are logical functions. Templates can make it easy to express common constraints such as:

Two classes are disjoint.
Two functions or a function and relation, are inverse to each other.
A function is one-one (alternatively, onto).
Limitations on the cardinality of a relation.

In accordance with a preferred embodiment of the present invention, ontology modelers can choose templates that are useful for describing rich information about their domains, rather than expressing themselves directly using first order logic. An important set of constraints are those that correspond to constraints that exist implicitly in the structure of relational databases. It is noted that two constraints, which directly impact vocabulary, are included already in the ontology model; namely, inheritance and functions, which are constrained relations.

FIG. 5 also includes a version control layer 530. Version control provides a general model, which is here applied to ontology, for tracking changes to a model and avoiding clashes between changes. Version control allows the evolution of a model to be tracked. Preferably, layer 530 provides a simple model of version control which can be integrated directly within ontology tools.

Version control is useful for a project or model where
The model is separable into a number of components, typically corresponding to separate operating system files.
Multiple users are editing the model.

Version control has the following objectives:
Ensure that two edits do not clash, by ensuring that no two users are editing the same component at the same time.
Allow temporary edits to be tested by an editor transparently to other users.
Track changes
  Maintain a history of components.
  Maintain a record of who made changes, their comments on the changes, and groupings of changes that affect multiple components.
  Note particular points in time where the model is given a version number.

Preferably edits on a component are allowed only by one user who has "checked-out" the component. Such a user sees the edited version while others do not see the edits until a "check-in" is performed.

Preferably version control layer 530 relates to components that coincide with the resources used for access control, as described hereinbelow. This allows access control to control who may check out a component and what changes he can make.

For each component there is preferably maintained:
A current version.
A list of previous versions of the component, storing only incremental changes where possible, to save storage space, and for each version:
  A note of who made changes.
  Notes on the changes.
  Dates and times of changes.
  Version number or numbers if any versions were declared while that component version was current.
A temporary version if "checked-out," and a name of who checked it out Preferably there is further maintained a central list of "releases" which, when declared, are referenced in the history of all components.

FIG. 5 also includes an access control layer 540. Access control provides a general model, which is here applied to ontology, for managing the assignment of permissions in a system with many resources, many users and many types of resource access.

The basic concepts in access control are as follows.

User—an individual who wishes to access resources in a system.

Resource—a resource to which different users are given access. Each resource is preferably associated with a unique User known as the Owner, who is the ultimate authority on who can access the Resource.

Resource Category—a category of Resources for which generally the same access types apply.

Access—a specific type of operation such as read, write (or at a higher granularity, read a certain field) which is relevant to a specific Resource Category.

Privilege—the granting to a User of a specific Access right to a specific Resource.

In principle access control can allow each Resource Owner to list, for each of his Resources and for each User, a list of Access privileges permitted to that User for that Resource. However, this quickly becomes unmanageable. To mitigate the management difficulty, the following concepts are introduced.

User Group—a set of Users, or of other User Groups, where this set is determined from time to time by a User Group Owner.

A User Group is preferably used to group together a certain set of Users (e.g., "Gold subscribers," "IBM employees," "IBM Finance Department employees," "users with no fines in the last two years") with some common property or who are to be entitled to some common set of privileges. The User Group Owner will be someone who is trusted, by at least some owners, to manage the User Group reliably, so that the Owner will feel confident in assigning privileges to the whole group.

Preferably, recursive use of User Groups is permitted; i.e., inclusion of group A as a member of group B means that all members of A necessarily satisfy the criteria to make them members of group B. E.g., "IBM employees" may have members such as "IBM Finance Department employees." When assigning a privilege to group B one is by implication assigning privileges to members of group A, and therefore trusting that the Owner of Group B, in assigning Group A as a member, is also monitoring who the Owner of Group A is admitting as members.

The term User Grouping is used for either a User or a User Group.

Resource Group—a set of Resources, or of other Resource Groups, all of which are of the same Category and have the same Owner, who is also the Owner of the Group and who determines which Resources are in the set.

A Resource Group is preferably used to group together a certain set of an Owner's Resources to which the Owner may want to assign privileges at some time (e.g., "resources I share," "most sensitive resources," "resources I share with ABC").

Preferably, recursive use of Resource Groups is permitted; i.e., inclusion of group A as a member of group B means that all members of A necessarily satisfy the criteria to make them members of group B. E.g., "Resources I share with ABC" may have members such as "Resources I don't care about".

The term Resource Grouping is used for either a Resource or a Resource Group.

Access Group—a set of accesses, all relevant to the same Group. These may be defined recursively and are predefined for any given system.

The Access Group is preferably used to define access types that typically go together as a level of privilege. E.g., "Write Privileges" may include the Access "Write field 1," "Write field 2" and the Group "Read Privileges."

Access Control List—a unique set attached by a Resource Group Owner to a Resource Grouping listing multiple User Groupings and, for each User Grouping, a list of Access Groups indicating privileges which the User Grouping is granted to Resources in the Resource Grouping.

Access control layer 540 preferably allows anyone to create and manage a User Group. It further allows any Resource Owner to create and manage Resource Groups. It further allows any Resource Owner to attach and manage an Access Control List for each Resource Grouping.

A User is granted an Access to a Resource if such Access is in at least one Access Grouping granted to at least one User Grouping in which such user is a member, for at least one Resource Grouping in which such Resource is a member.

Preferably only a Resource or Resource Group Owner can change ownership of a Resource Grouping. A change of ownership for a Resource Grouping preferably recursively changes ownership of member resources, and removes the Resource Grouping from Resource Groups to which it belongs.

Control of creation of Resources is preferably exercised by associating a command to create a Resource, with another Resource. For example, in a file system a directory may be a Resource and the Resource Owner decides who has permission to use the directory's create file Access, to create a new file in the directory owned by its creator.

Thus, using access control an author of a class protects who can see the class, who can read it, who can update it (i.e., make changes of a permitted type) and who can edit it. Access can be controlled at the fine resolution of individual classes, relations, functions and inheritance pair definitions, each of which are resources that have an owner who assigns access permissions to others.

FIG. 5 also includes a relational sub-ontology layer 550. Relational sub-ontologies are subsets of an ontology that correspond to a specific relational database.

FIG. 5 also includes a relational mapping layer 560. A relational mapping is an actual correspondence between a suitable subset of an ontology and a specific relational schema. Specifically, each field type in a relational database may correspond to a class in the ontology. Each n-field table in a relational database may correspond either to an n-ary relation on the n classes corresponding to the field types, or to a class. In the latter case, each field type induces a binary relation between the class corresponding to the table and the class corresponding to the field type.

Reference is now made to Table I, which is a simple example of a relational database table.

TABLE I

| Flight Bookings | | |
|---|---|---|
| Person | Flight | Seat |
| John | 001 | 10B |
| Fred | 002 | 20K |

The field types Person, Flight and Seat, which may in themselves be joins to other tables, correspond to classes Persons, Flights and Seats in an ontology. The table Flight Bookings may be considered as a tertiary relation with domain Persons x Flights x Seats. This relation includes two triplets, corresponding to the two rows in Table I.

Alternatively, the table Flight Bookings may be considered as a class Flight Bookings, with two instances, corresponding to the two rows in Table I. The field type Person induces a binary relation between Flight Bookings and Persons, in which the first Flight Bookings instance is related to Persons instance John, and the second Flight Bookings instance is related to Persons instance Fred. Similarly, the field type Flight induces a binary relation between Flight Bookings and Flights.

It may be appreciated that if the table Flight Bookings is used as a type in other tables, it is preferable that the table correspond to a dedicated class, rather than to a relation.

FIG. 5 also includes an instance structures layer 570. Layer 570 preferably provides the ability to directly document instances according to an ontology.

Preferably, an instance structure associates

A set of instances $B(c)$ with each class symbol, c, such that the set associated with a subclass is a subset of the set associated with a superclass thereof.

A relation on (i.e. subset of) $B(c_1) \times B(c_2) \times \ldots \times B(c_n)$, with each relation symbol r of domain $c_1 \times c_2 \times \ldots \times c_n$.

A function from $B(s)$ to $B(t)$ with each function symbol f of domain s and co-domain t; i.e., for each instance $x \in B(s)$ there is associated precisely one element $f(x) \in B(t)$.

The concept of an instance structure contributes to understanding an ontology, since an ontology is purely a guide for creating instance structures and a vocabulary for talking about them.

FIG. 5 also includes a view layer 580. As described hereinabove, Views are preferably used to provide templates for talking about instances by documenting specific combinations of attributes that define or reference an instance in particular circumstances. Views are an extension to the ontology model. One or more Views may be attached to each class in an Ontology Model.

As well as defining Views abstractly, Views may be generated for specific instances from the instance structure described hereinabove.

FIG. 5 also includes a View/XML-Schema mapping layer 590. The abstract model of a View, defining a tree of attributes, is similar to the syntactical schema of an XML Schema document. By mapping an equivalence between a View and an XML Schema document, the XML documents validated by the Schema may then be used to describe instances. Such a mapping is preferably created between an existing Ontology and XML Schema, or alternatively, the XML Schema may be generated on the fly together with the mapping. The mapping associates Views with XML Schema types and adds syntactic information such as element names.

In a preferred embodiment of the present invention, Packages are used to manage the many names that can arise in an ontology web. Definitions are sorted into Packages, an idea borrowed from Java. Preferably, Packages are implemented as a simple hierarchy starting with a Root Package which has no parent. Every Concept (class, relation, function, inheritance) preferably belongs to one Package, and its full name is preferably the Package path from the root plus the Concept name.

Names of a Concept are preferably unique within a Package. When defining a Concept within one Package, a GUI preferably recognizes local names within that Package without a path. Other Packages are imported for convenience, provided there are no name conflicts. Preferably, Packages have owners who control who can add or delete things therefrom. Each Package and each Concept is a Resource. Creating a new Concept is preferably done through a Package, subject to permission to create.

Packages are a Resource type. Their Accesses are API calls that are grouped into Create sub-Package Delete sub-Package Delete Package Create Concept.

Concepts are a Resource type. Their accesses are API calls that are grouped into See (i.e., see that it exists)

Read (includes See)

Update (includes Read plus check-out and certain edits)—perform changes that preserve backward compatibility only Write (includes Updates)

All (includes Write plus Delete)

Preferably, each Resource is also a component for version control purposes.

FIGS. 6–10 are Unified Modeling Language (UML) static structure class diagrams, which show how to implement the various models described above using an object oriented programming language such as Java or C++, in a preferred embodiment of the present invention.

Figure 6:
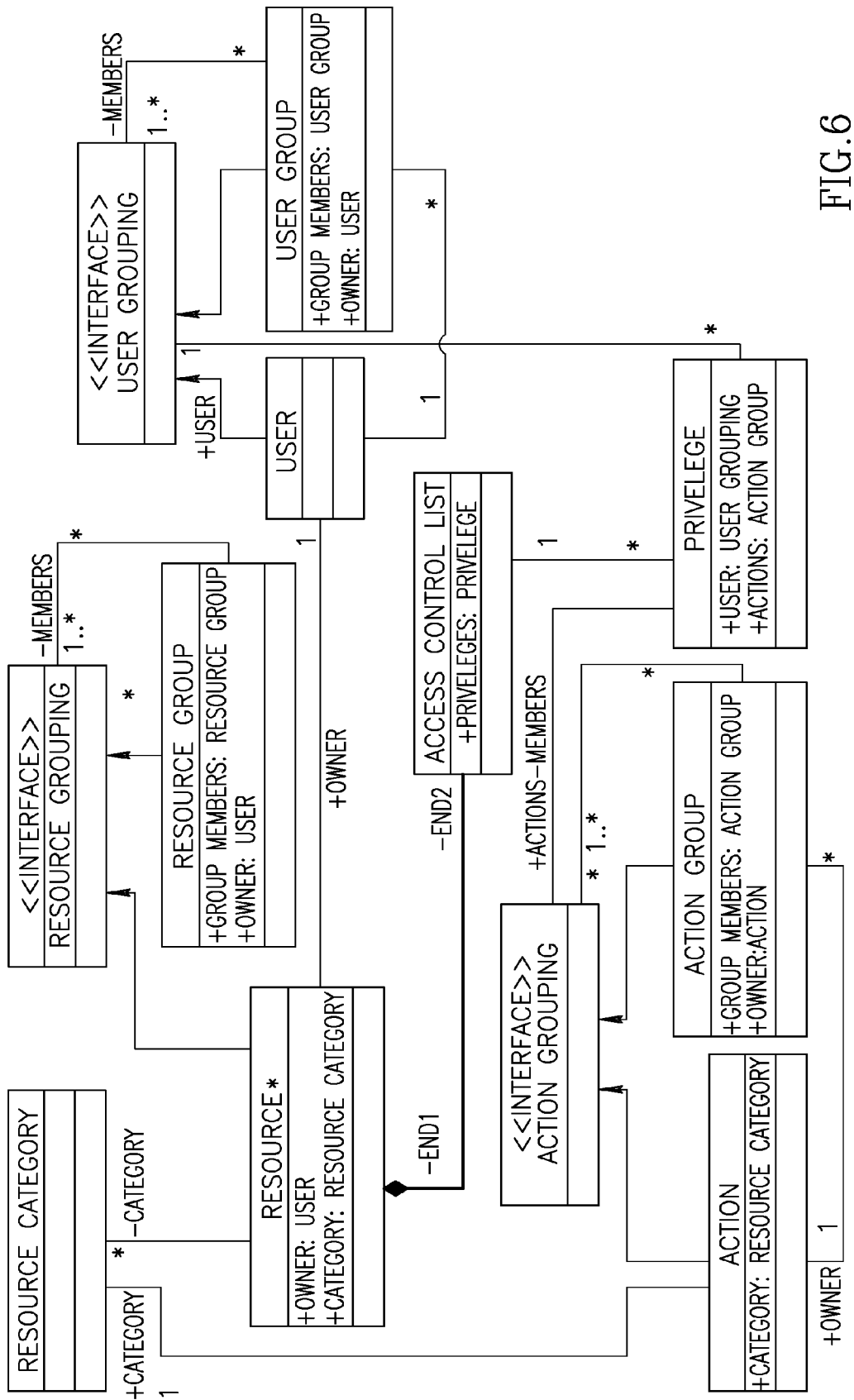
FIG. 6 is a Unified Modeling Language (UML) diagram of a preferred access control model.

Reference is now made to FIG. 6, which is a UML diagram of a preferred access control model.

Figure 7:
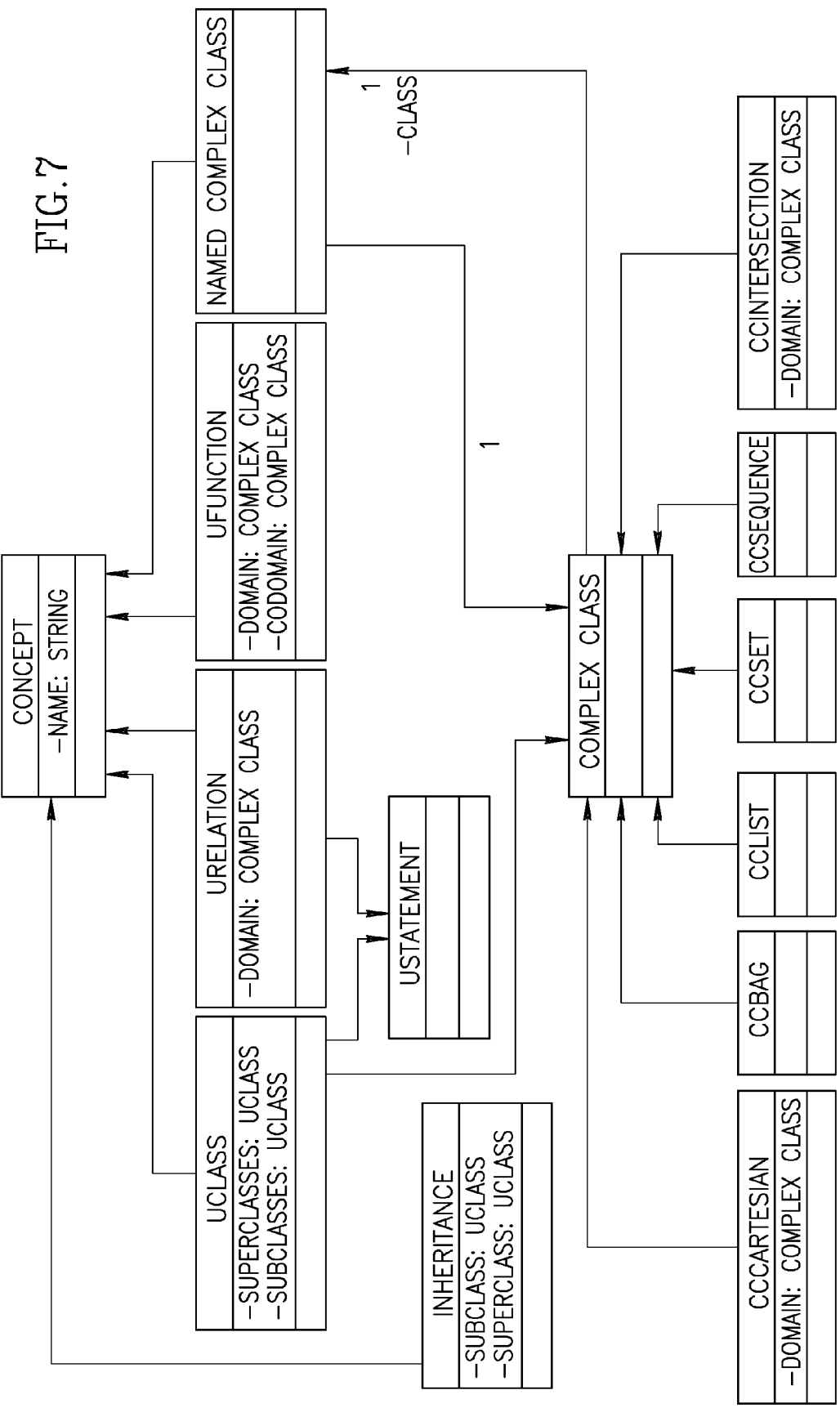
FIG. 7 is a class diagram for an ontology model, in accordance with a preferred embodiment of the present invention.

Reference is now made to FIG. 7, which is a class diagram for an ontology model, in accordance with a preferred embodiment of the present invention.

In a preferred embodiment of the present invention, a relation and a class are both types of statements. This is apparent for a relation, but additionally a class Book forms a statement "is a book", which is always unary. Preferably, inheritance is modeled with a helper class in order to allow separate authorship of inheritance relations. Concepts are the primary components of an ontology, which preferably have a label and description in order to associate them to the real world. Preferably, Being does not have superclasses. Further types of complex classes, such as intersections, sets, lists and sequences, are not shown in FIG. 7.

The bottom of the diagram in FIG. 7 shows how an access control model is implemented in a preferred embodiment, as described hereinabove.

Figure 8:
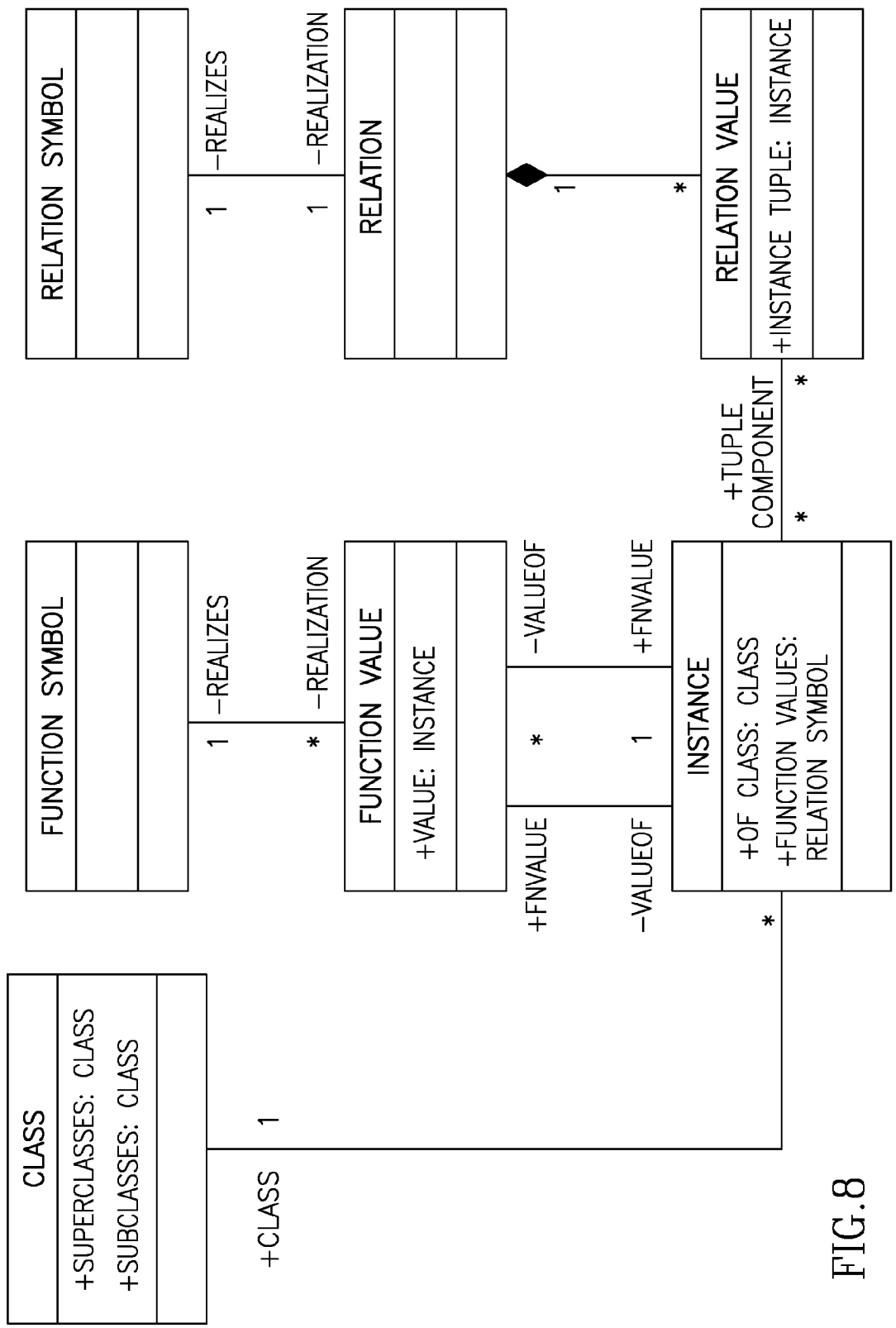
FIG. 8 is an extension to FIG. 7 accommodating instance structures, in accordance with a preferred embodiment of the present invention.

Reference is now made to FIG. 8, which is an extension to FIG. 7 accommodating instance structures, in accordance with a preferred embodiment of the present invention. Instances are illustrated as being associated with one class, and it is implicitly implied that they also belong to superclasses thereof. Preferably, there is one FunctionValue object for each instance and for each function defined on the class of that instance or on any superclass of that class. The RelationValue preferably contains a tuple of instances suited to the domain of the relation, or to subclasses thereof.

Figure 9:
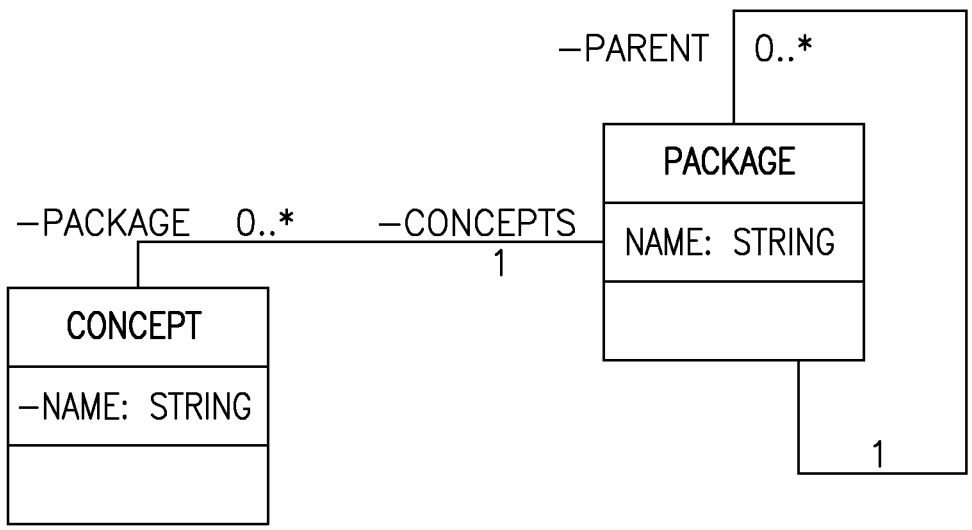
FIG. 9 is an extension to FIG. 7 showing how concepts may be organized according to a hierarchy of packages, in accordance with a preferred embodiment of the present invention.

Reference is now made to FIG. 9, which is an extension to FIG. 7, showing how concepts may be organized according to a hierarchy of packages in accordance with a preferred embodiment of the present invention.

Figure 10:
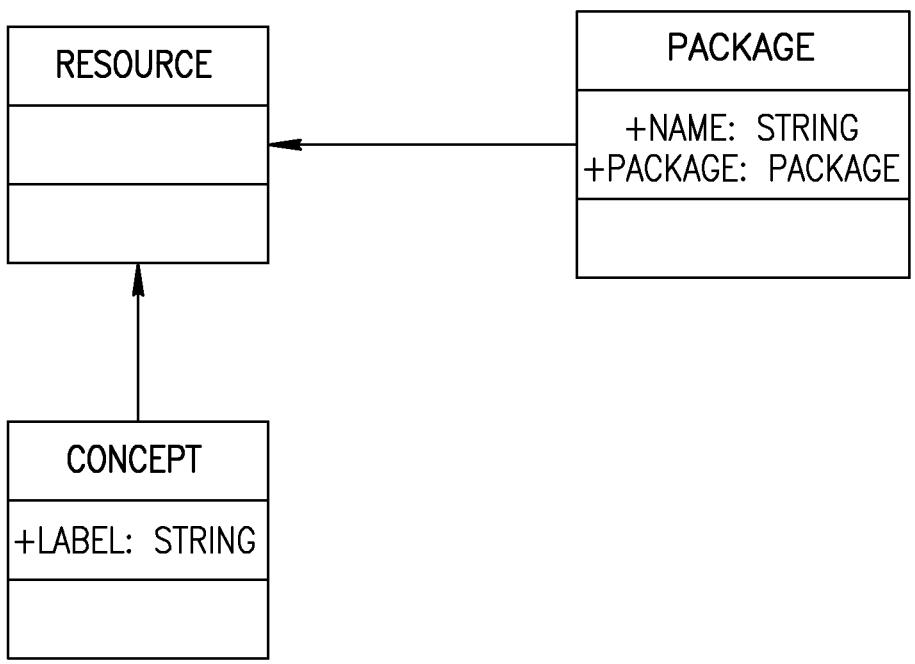
FIG. 10 is an extension to FIGS. 7 and 9 showing objects that are treated as resources for the purpose of having independent access control, in accordance with a preferred embodiment of the present invention.

Reference is now made to FIG. 10, which is an extension to FIGS. 7 and 9, showing which objects are treated as resources for the purpose of having independent access control in accordance with a preferred embodiment of the present invention.

Figure 11A:
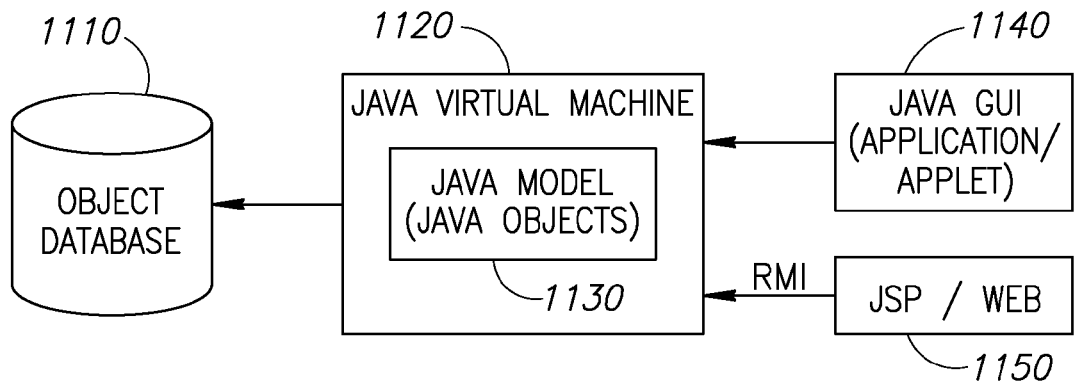
FIGS. 11A and 11B are simplified block diagrams of run-time platforms for implementing a preferred embodiment of the present invention.
Figure 11B:
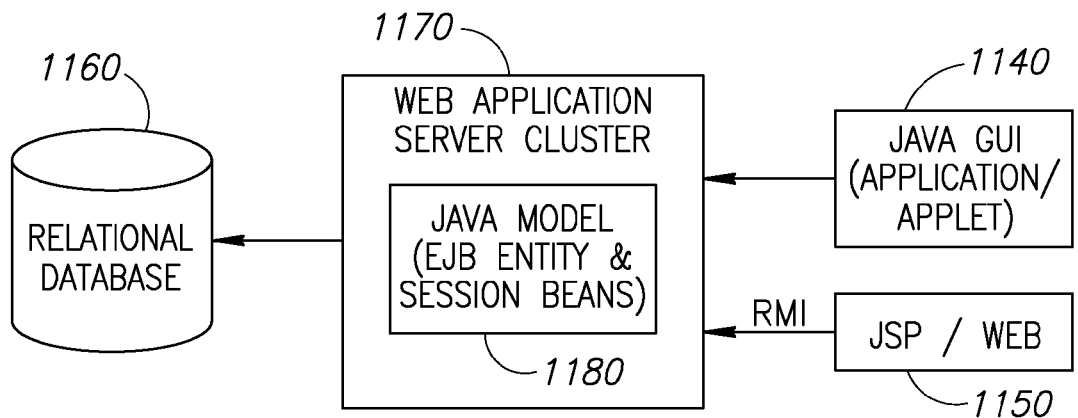

Reference is now made to FIGS. 11A and 11B, which are simplified block diagras of run-time platforms for implementing a preferred embodiment of the present invention. Preferably, the platforms cater to collaborative authoring and managing of all aspects of an ontology model, and transform instance-data between data sources.

In a preferred embodiment of the present invention, a Java model is created in parallel to the ontology model. The Java model is described hereinabove by the UML diagrams in FIGS. 6–10. Preferably, the architecture used to implement the present invention enables persistence and simultaneous access.

FIG. 11A illustrated an easy-to-implement non-scaleable architecture, and FIG. 11B illustrates a scaleable architecture. Shown in FIG. 11A is an object database 1110, and a Java virtual machine 1120 including a Java representation of the ontology model 1130, including access control and version models, according to the UML class hierarchies described hereinabove. Also shown is a Java applet or application 1140 serving as a graphical user interface (GUI), and a Java/web server 1150 communicating with Java virtual machine 1120 using a remote method invocation (RMI) protocol. It may be appreciated that use of an object database allows persistence with little coding, and obviates the need for XML syntaxes for parts of the model.

FIG. 11B shows a similar block diagram as FIG. 11B, with a relational database 1160 instead of object database 110, a web application server cluster 1170 instead of Java virtual machine 1120, and an enterprise Java Beans (EJB) model 1180 instead of Java object model 1130.

Instance Browser

In a preferred embodiment, the present invention uses a graphical user interface to provide visual graphical elements which correspond directly to classes, instances, relation values and statements on the ontology web, or statements on a knowledge web that uses vocabulary of the ontology web to introduce instances and statements about instances.

Figure 12A:
FIGS. 12A–12F are illustrations of the use of icons for navigating instances that are organized according to an ontology, and logically defined sets of such instances, in accordance with a preferred embodiment of the present invention.
Figure 12B:
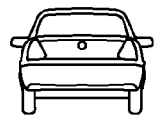

Reference is now made to FIGS. 12A–12F, which are illustrations of the use of icons for navigating instances that are organized according to an ontology, and logically defined sets of such instances, in accordance with a preferred embodiment of the present invention. FIG. 12A indicates an icon for a class of Sports Utility Vehicles. FIG. 12B indicates an icon for a specific instance of a sports utility vehicles. Preferably the icon in FIG. 12A, which represents an abstract class, is abstract, and the icon in FIG. 12B, which represents a specific instance, is photo-realistic.

Figure 12C:
Figure 12D:

FIG. 12C indicates an icon for an attribute, or property, of a class. FIG. 12D indicates an icon for accessing all attributes of a class.

Figure 12E:
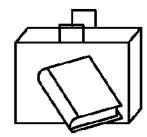
Figure 12F:
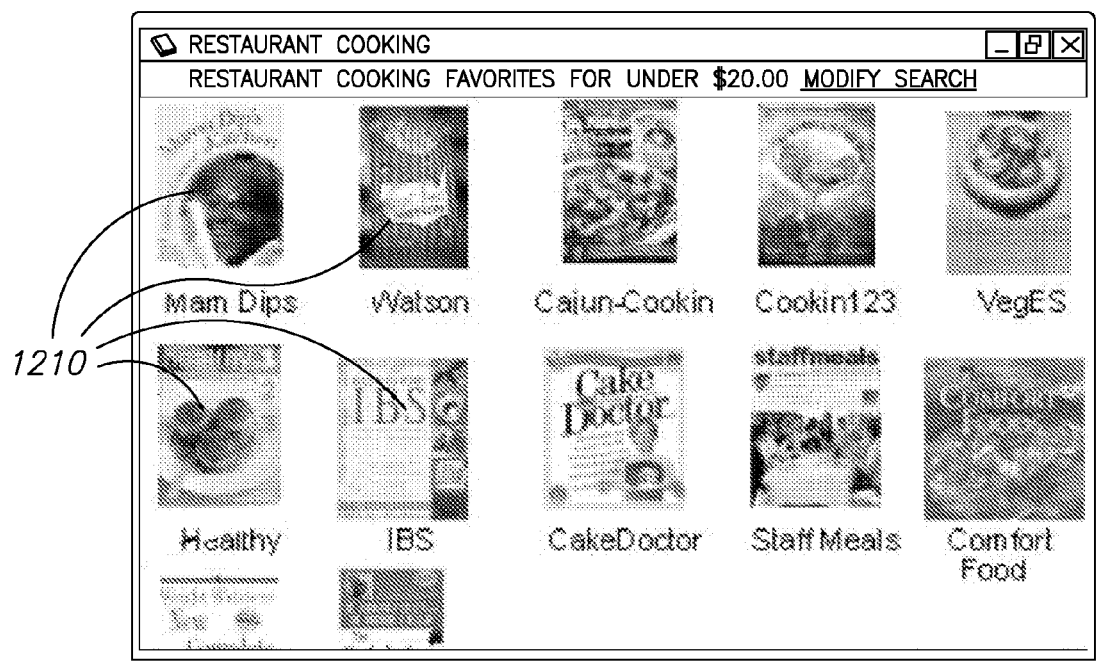

FIG. 12E indicates an icon for a collection of books. FIG. 12F illustrates the collection of books corresponding to tie icon of FIG. 12E. That is, the icon of FIG. 12E illustrates a collection of books that is iconized by a user, and FIG. 12F illustrates a collection that has been opened. It is noted in FIG. 12F that the collection is referred to as Restaurant Cooking, and the specific books in the collection are indicated by icons 1210 for instances of books.

Figure 13A:
FIGS. 13A and 13B are illustrations of processes associated with instances of classes, in accordance with a preferred embodiment of the present invention.
Figure 13B:
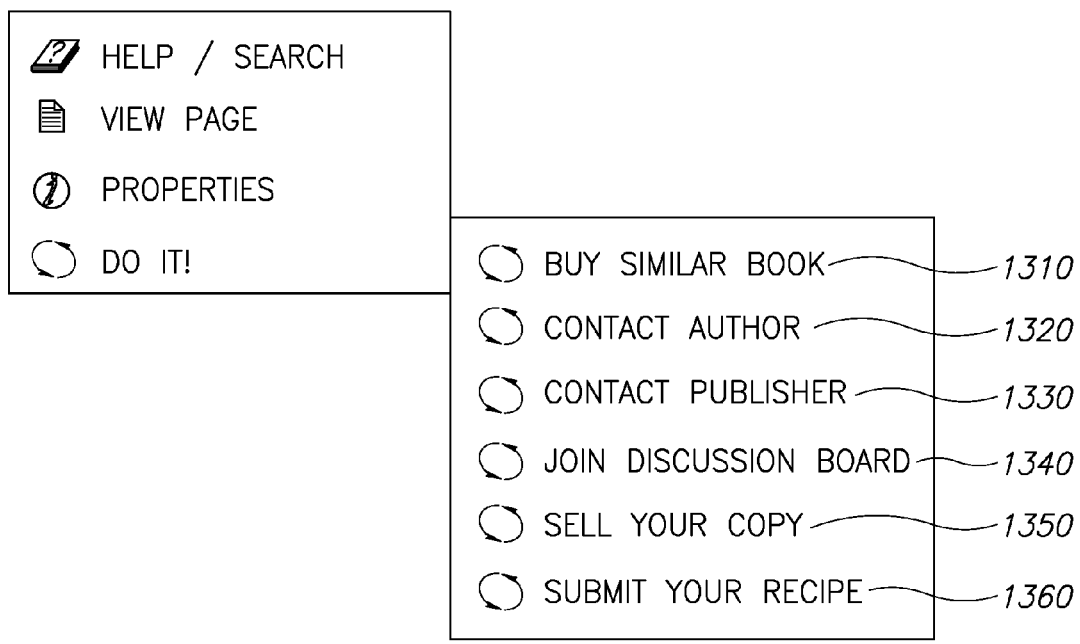

Reference is now made to FIGS. 13A and 13B, which are illustrations of processes associated with instances of classes, in accordance with a preferred embodiment of the present invention. FIG. 13A indicates an icon used to represent a process. FIG. 13B illustrates cascaded menus for processes associated with an instance of a book from the collection of Restaurant Cooking Books (FIG. 12F). The processes include (i) buy a similar book (1310), (ii) contact the author (1320), (iii) contact the publisher (1330), (iv) join a discussion board (1340), (v) sell your copy (1350), and (vi) submit your recipe (1360). The icon of FIG. 13A appears adjacent to each of the processes 1310–1360.

Figure 14A:
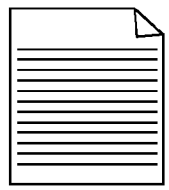
FIGS. 14A and 14B are illustrations of a page containing links to various classes, in accordance with a preferred embodiment of the present invention.
Figure 14B:
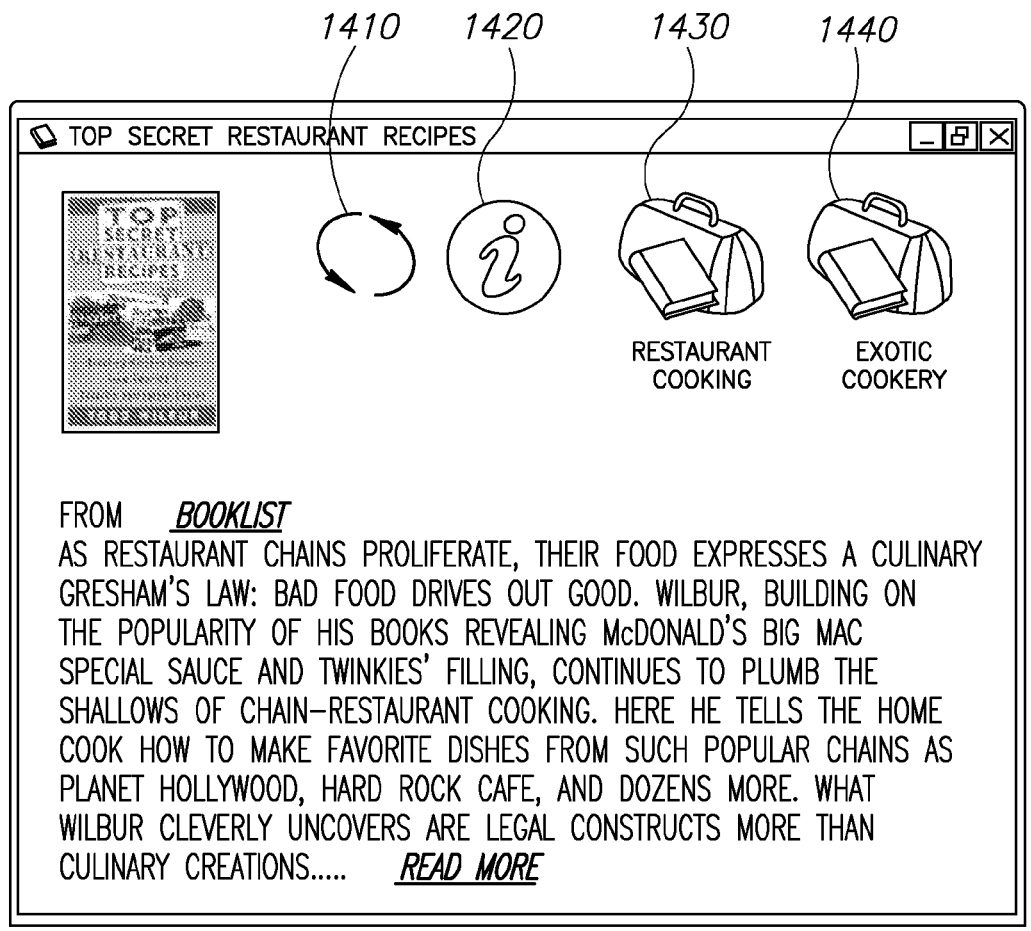

Reference is now made to FIGS. 14A and 14B, which are illustrations of a page containing links to various classes, in accordance with a preferred embodiment of the present invention. A page is a generalization of an HTML page with the additional capability of embedding icons representing classes, instances and collections that are relevant to contents of the page. FIG. 14A indicates an icon used to represent a page. FIG. 14B illustrates a page for a book entitled "Top Secret Restaurant Recipes." The page includes (i) a process icon 1410 for accessing processes associated with the illustrated book, such as the processes shown in FIG. 13B; (ii) an attribute icon 1420 (cf. FIG. 12C), for requesting information about the attributes of the illustrated book; (iii) an icon for a collection of books 1430 (cf. FIG. 12E) entitled "Restaurant Cooking" and (iv) an icon for a collection of books 1440 (cf. FIG. 12E) entitled "Exotic Cookery." Both collections are related to the illustrated book.

Figure 15A:
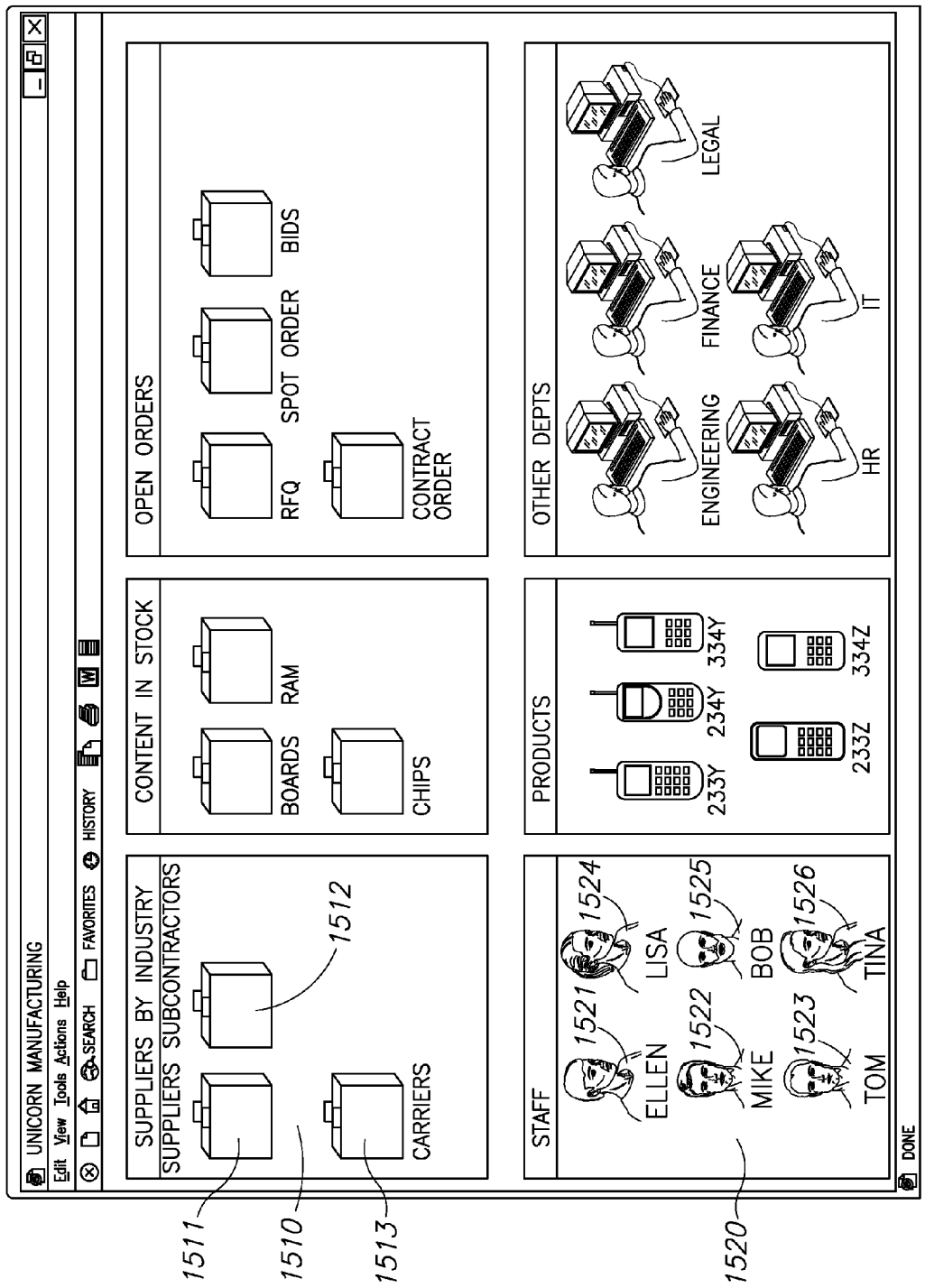
FIGS. 15A–15E are illustrations of a graphical user interface for navigation through class and relation definitions, in accordance with a preferred embodiment of the present invention.

Reference is now made to FIGS. 15A–15E, which are illustrations of a graphical user interface for navigation through class and relation definitions, in accordance with a preferred embodiment of the present invention. Shown in FIG. 15A are windows containing instances of classes, and collections of instances of classes. Individual instances are depicted by photo-realistic icons, and collections of instances are depicted by folders. A window 1510 contains folder icons 1511, 1512 and 1513 for collections of instances of suppliers, subcontractors and carriers, respectively. Window 1520 contains instance icons 1521, 1522, 1523, 1524, 1525 and 1526 for departmental staff.

Figure 15B:
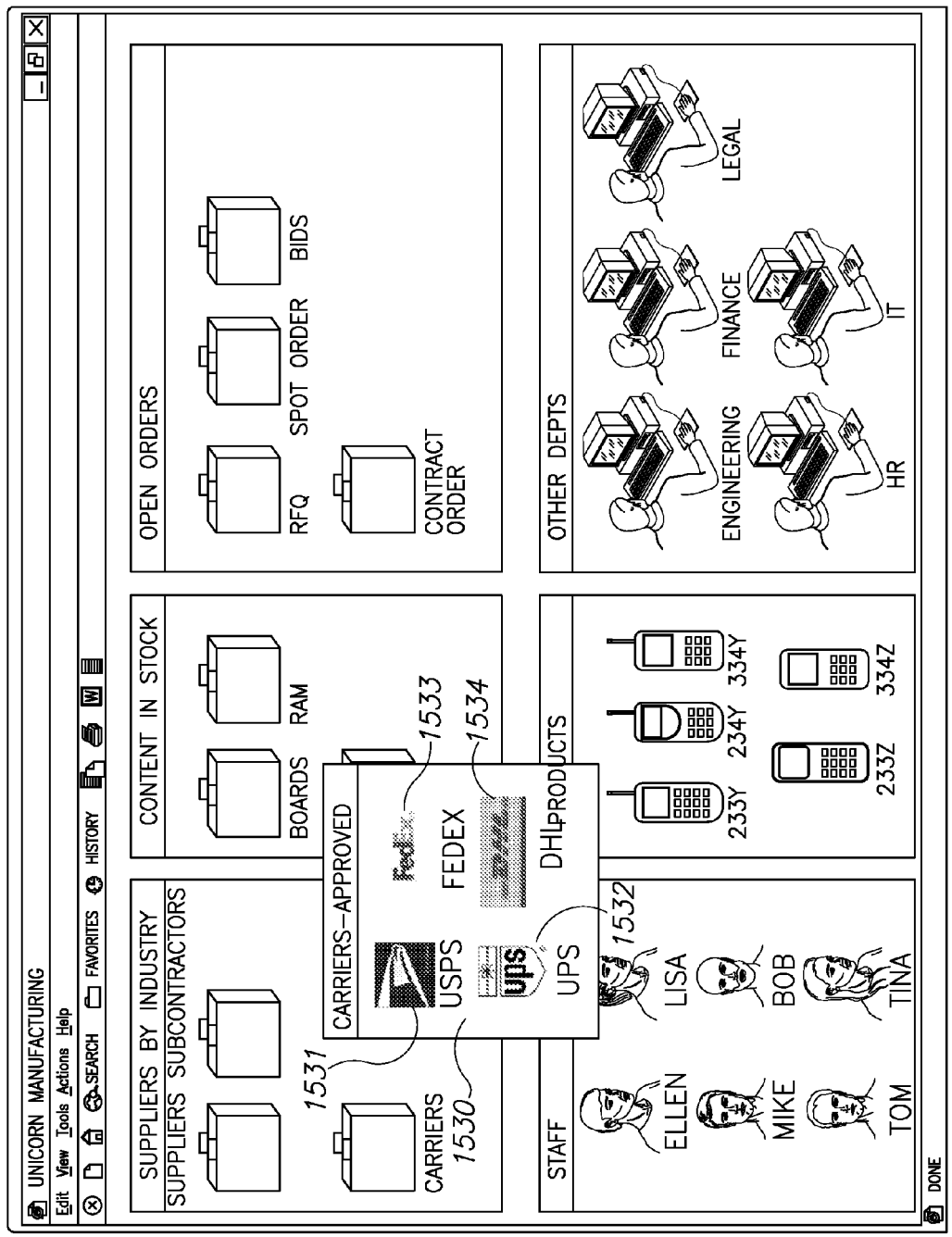

Shown in FIG. 15B is a window 1530 with instance icons 1531, 1532, 1533 and 1534 for carriers. Preferably, window 1530 pops up when a user right-clicks on folder icon 1513.

Figure 15C:
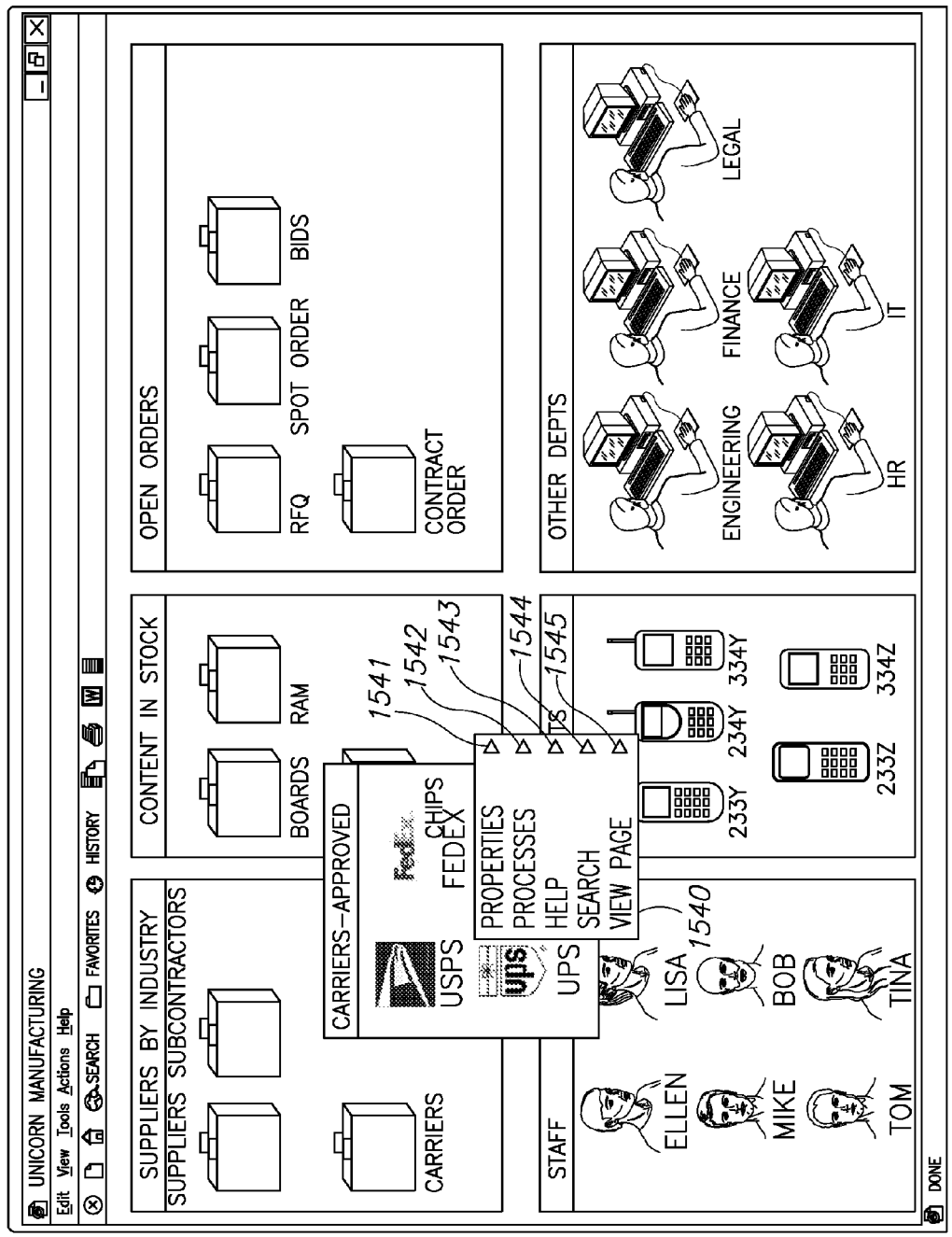

Shown in FIG. 15C is a list 1540 of options relating to a specific carrier, UPS. List 1540 includes an item 1541 for properties of the UPS carrier, an item 1542 for processes for the UPS carrier, an item 1543 for help, an item 1544 for search and an item 1545 for view page.

Figure 15D:
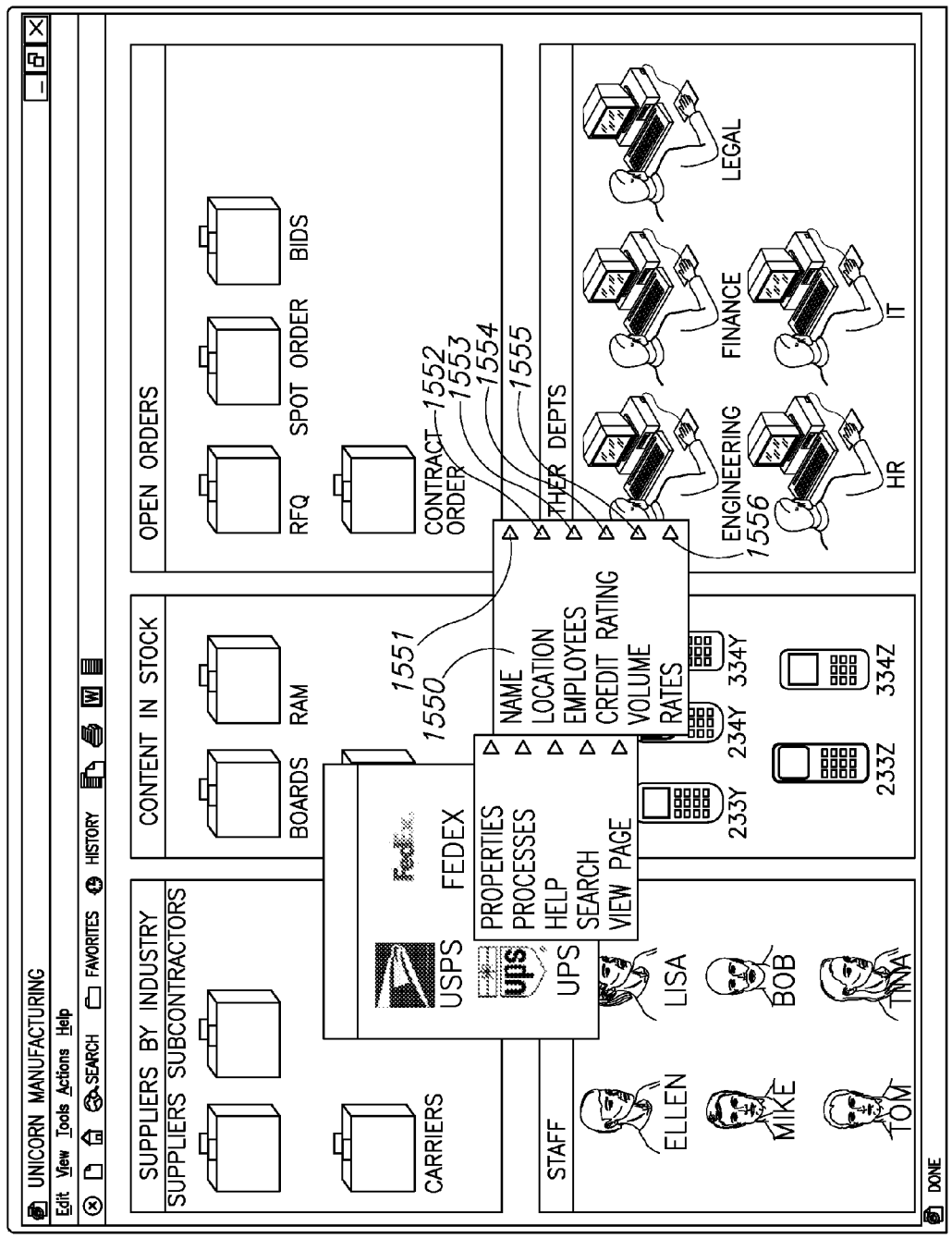

Shown in FIG. 15D is a further list 1550 of properties for carrier UPS. Preferably, list 1550 pops up when a user clicks on item 1541 in list 1540 (FIG. 15C), requesting to view properties of the UPS carrier. As seen in FIG. 15D, displayed properties include name 1551, location 1552, employees 1553, credit rating 1554, volume 1555 and rates 1556.

Figure 15E:
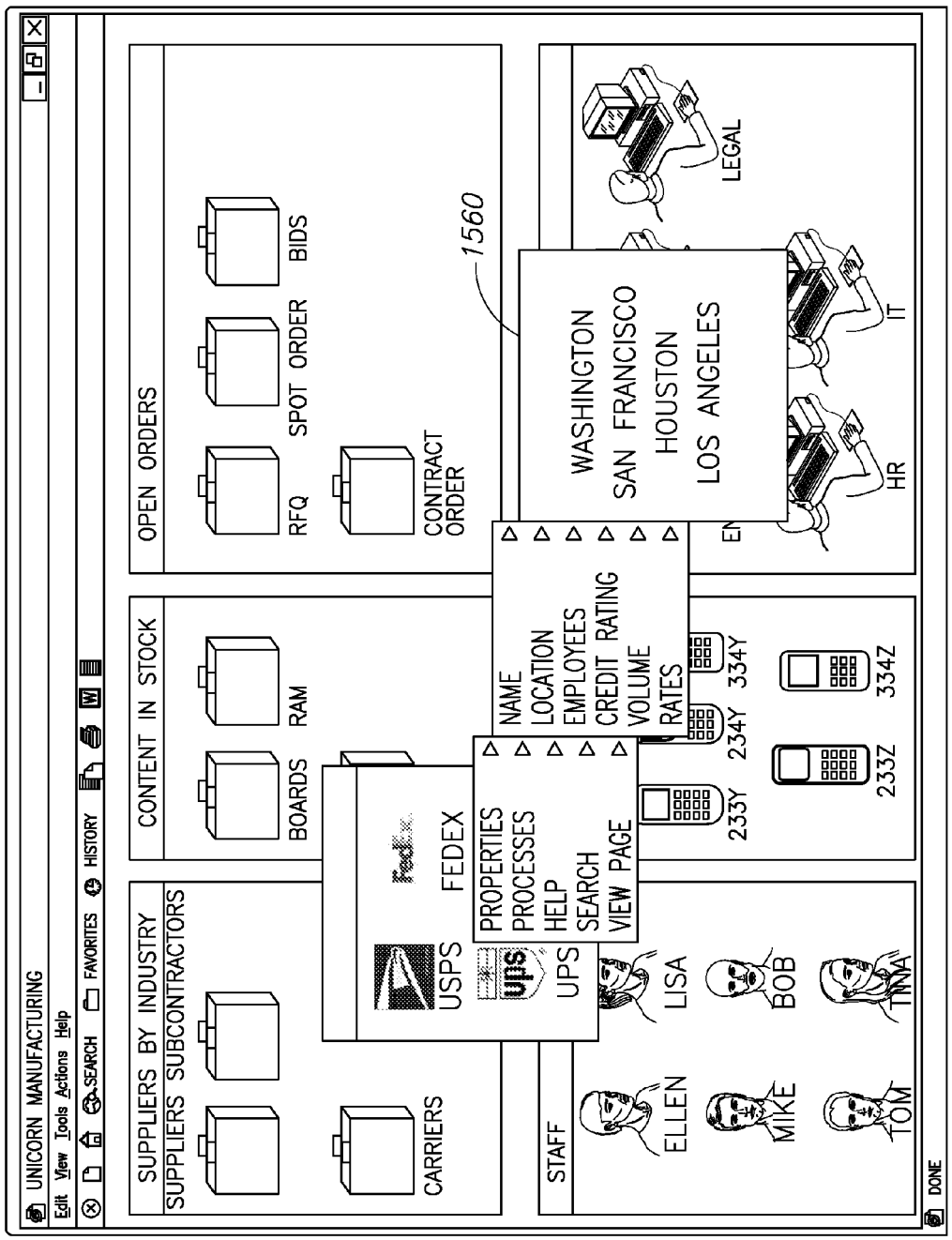

Shown in FIG. 15E is a list 1560 of UPS locations. Preferably, list 1560 pops up when a user clicks on item 1552 in list 1550 (FIG. 15D), requesting to view locations of the UPS carrier. Each location in list 1560 itself an instance of a class for locations, and can be further identified by clicking on it. It is thus apparent that the user interface illustrated in FIGS. 15A–15E can be continued recursively.

It may be appreciated that what is presented to the user as an attribute of a class is the value of a function appropriate to the class.

An advantage of the user interface shown in FIGS. 15A–15E is that various information about UPS from different sources, including procurement managers, supplier management systems, Dunn and Bradstreet, and UPS themselves, is presented through a right-click on the UPS icon, since the icon represents an agreed upon ontological reference to UPS. Upon right-clicking on the icon, a graphical user interface tool preferably searches for statements about UPS using an agreed upon ontological vocabulary; namely, functions that have the class Companies as domain. Specifically, the graphical user interface tool searches the ontology for attributes of the class of the instance, and then searches for instance information, including values for these attributes, as described hereinbelow.

Ontology allows values themselves to be instances, so that a user can navigate through the knowledge. For example, after finding a location of UPS, the user can then look for information on how to get to that location. Similarly after finding the author of a book, the user can right-click on an icon of the author to find the author's phone number, or other publications by the same author.

In order to track data on instances, a preferred embodiment of the present invention defines within an ontology web a function called GID (for global identification) from Being to the natural numbers. As mentioned hereinabove, "Being" is a superclass of all classes. If a constraint language is available, this function is preferably constrained to be one-one.

Information about instances is preferably published in the following way: a structured document, such as an XML document, lists the instance's class, its GID, and one or more pairs of function name & value. Alternatively a View may be published in which a specific combination of function name & values is listed, and possibly composed functions as well. The value may be listed simply through its GID, or iteratively a View of the value may be used. Such documents are preferably published and indexed by a standard database or web search engine based on GID, and preferably also by class and by function names present.

An example of such a structured document is as follows:

```
<instance>
    <class>
        http://www.abc.org/ontology/cars/audi#A4
    </class>
    <instance>
        0947320494365087
    </instance>
    <value-pair>
        <name> manufacturer </name>
        <value> 234812942734 </value>
    </value-pair>
    <value-pair>
        <name> metal type </name>
        <value> 2348573209 </value>
    </value-pair>
</instance>
```

In a preferred embodiment of the present invention icons for displaying a graphical representation of an instance are introduced through a function called Icon that is defined from Being to Images, or to a more specific class such as Jpeg Icon Images.

In an alternative embodiment of the present invention, images are introduced only for classes, so that every instance in a class has the same icon with a different caption. Preferably, in every <class> declaration an icon field is added with a URL of an icon. Equivalently, there is a Caption function from Being to String, and if a constraint language is available it may be noted that Caption and Name coincide as functions on People.

In a preferred embodiment of the present invention, captions are preferably taken from a certain parameter of type String. E.g., in the declaration of a class People, a function Name from People to String is marked as the one used to generate captions.

In an alternative embodiment of the present invention, captions are implemented through a function from Being to Strings.

Preferably, there is more than one function for Icon and Caption, and each specific implementation of a browser tool uses a different one, or allows a user to select one.

In order to display an icon for an instance on a computer display; that is, an icon which looks similar to a Windows icon for a file but which instead represents some physical or real world entity, the following steps are preferably taken:

The instance is stored using its GID, or alternatively according to a View for the class. E.g., a book is stored using Author, Title and ISBN View.

The icon is looked up by searching for a document for the instance that also lists the icon URL property, or alternatively the icon is looked up by class.

The caption is looked up by searching for a document for the instances that include the caption, or an appropriate other function like Name, for the instance.

An icon and caption are created on the screen. It may be appreciated by those skilled in the art that standard library calls are used to create such icons; e.g., using Microsoft Windows libraries or Java Swing APIs.

A pop-up menu is attached to the icon using the standard library calls so that it is displayed upon right clicking on the icon.

The class of the icon is looked up directly through the relevant ontology server or via the ontology directory. For each function on the class, an appropriate item is added to the pop-up menu, such as Author or Name. If it is desired to display things other than attributes in the menus, the attributes are preferably grouped in a sub-menu under "attributes" within a primary pop-up menu.

To each such attribute an action is preferably attached, and an icon for the attribute value is preferably created as follows. When clicking on an attribute the program searches for instance documents for the instance that include the relevant function. Additionally, if author filtering is in place, documents with an inappropriate author are ignored. The GID of the instance is retrieved and an icon created for it as above. For certain fundamental classes such as String a value is preferably displayed within the menu rather than creating an icon. For example, a name of a person is displayed as name=Fred in the menu, rather than clicking on Name to get a new icon for the string "Fred."

It should be noted that what is described here is not necessarily a standalone application, but rather a procedure for use by an application that needs to display instances. The advantages of this procedure are:

Instances and their attributes are displayed consistently by all applications.

When one application displays an instance, a user can seamlessly obtain attribute information on the instance from other applications.

Icons are preferably grouped together in windows, as is done in the familiar Windows interface to file systems. Grouping is preferably implemented by keeping documents representing the icons within a folder on the file system.

Window type user interface elements are preferably created for grouping icons by a logically defined property. Such elements are referred to as "collections." Specifically, a collection is a logically defined set of instances; i.e., instances which share a common property visualized by displaying their icons within a single window.

For example, within a procurement management system collections may have a yellow title, showing the logical definition of the collection in English. The staff of a department is defined by a relation, and the information looked up dynamically from an HR system so that appropriate icons are displayed in a window representing this collection. Similarly for stock which represents the relation of content between StockRooms and Components, and where information ultimately comes from a company's ERP system.

Many types of collections are defined in terms of first order logic using an ontology as a types system, and many useful collections are defined with the use of relations. For example, for a relation WorksIn on domain Departments x People, one can define a useful collection of everyone who is related by WorksIn to a certain department instance. Similarly, for a relation Contains on StockRooms x Components, one can define a useful collection of component instances related by Contains to a certain stock room instance.

Systems such as an ERP system which have information on the relations between instances preferably publish in a format containing (i) the ontological name of the relation, and (ii) lists of appropriately typed tuples of instances. Such a format is closely related to the format in which relations are stored in a relational database, where each table represents a relation by a list of tuples.

An example of values for the above mentioned binary relation WorksIn are as follows:

```
<relation-values>
    <relation>
        http://www.a-company.com/abc/human-
resources/relations#worksIn
    </relation>
    <values>
        <tuple>
            <instance> 087434958743 </instance>
            <instance> 598723459713 </instance>
        <tuple>
        <tuple>
            <instance> 348534598234 </instance>
            <instance> 349857632459 </instance>
        <tuple>
    <values>
</relation-values>
```

Relations are preferably indexed using a standard database or web search engine based on the relation URL, and preferably also on the instances referenced, and preferably published using a standard web server. Information on author, or source of the information, may be added and used to filter trusted information.

In order to create a collection the following steps are preferably taken.

A structure file, such as an XML file, stores a definition of the collection: a name of a relation and an instance for each class in the domain except one. The collection is defined to include instances that can fit in that missing class and satisfy the relation.

A standard graphical element for displaying sets of things such as a window is instantiated from a standard library, such as a Windows or Java Swing GUI library.

The caption for the collection is derived in English from the formal definition; e.g., "All People who work in finance". Here People is the name of the second class which is in the domain of the relation WorksIn. The separate words "works in" preferably come from a description field in a document declaring the relation. Finance is the caption of this instance of departments. Preferably this definition is displayed prominently to emphasize that the collection is not a file system folder.

The web is searched for relation instance documents for the relation, and these are further searched for tuples where the second element is the instance finance. For each such instance an icon is created using the above mentioned technique, and inserted within the collection using standard library calls to add an icon to a window.

The content of the collection is preferably refreshed periodically or upon demand as desired.

It should be noted that what is described here is not necessarily a standalone application, but rather a procedure for use by an application that needs to display sets of instances. The advantages of this procedure are:

Collections of instances and their definition are displayed consistently by all applications.

When one application displays an instance collection, a user can seamlessly obtain information on this instance from other applications. For example, an engineer browsing a stock room collection, ultimately coming from an ERP system, may right click on an item in stock to find technical information originating from the manufacturer.

The contents of a collection may be too numerous to be conveniently displayed in one window. Accordingly, the definition of the collection preferably lists a number of subclasses of the class of the instances; such as subclasses of components, and all instances falling under these subclasses are collected inside the collection window under an icon representing the class. Such instances are displayed in a subsidiary collection window, after double clicking on the icon.

EXAMPLES

Figure 1A:
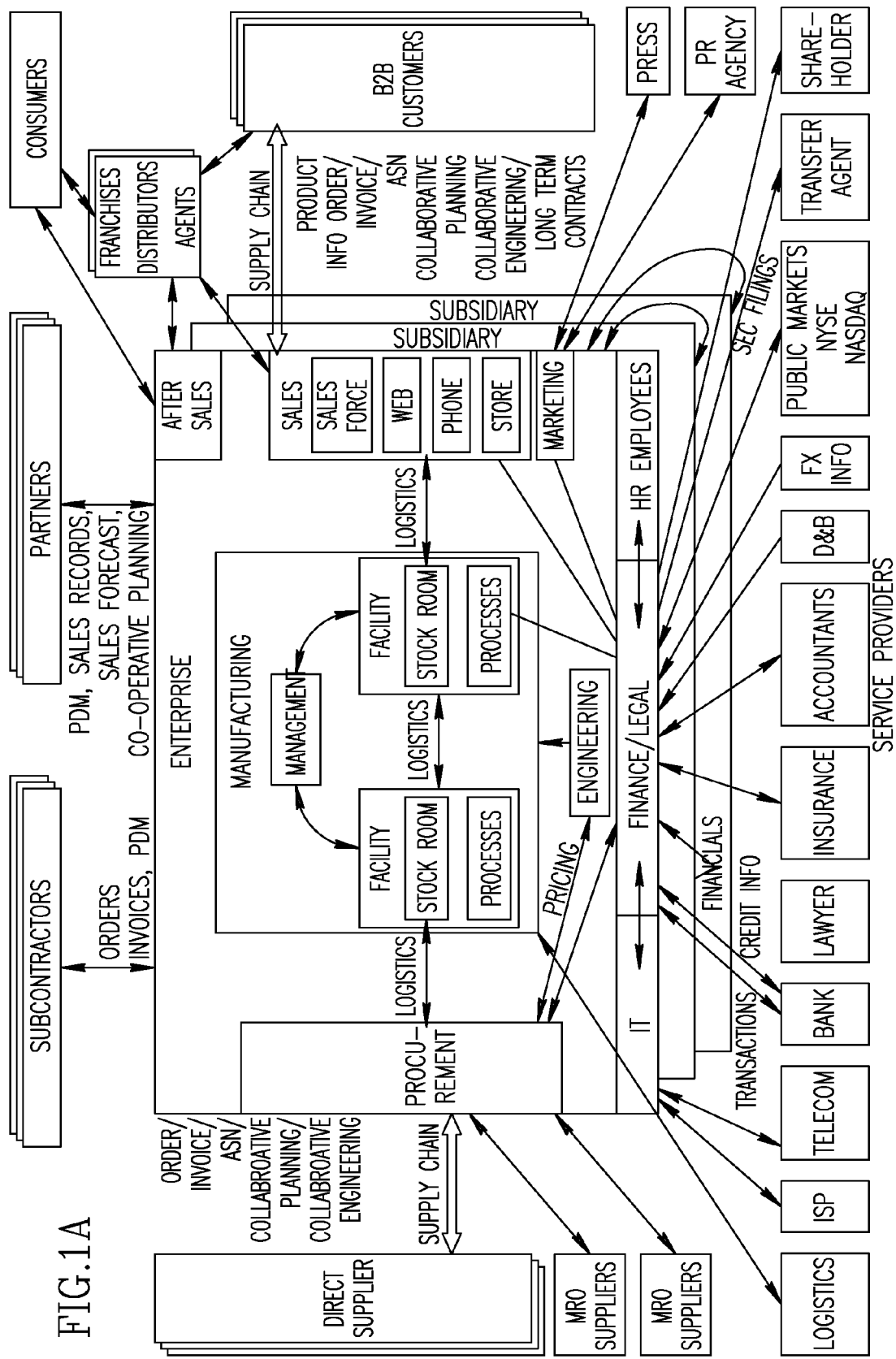
FIG. 1A is an illustration of enterprise knowledge relationships.
Figure 1B:
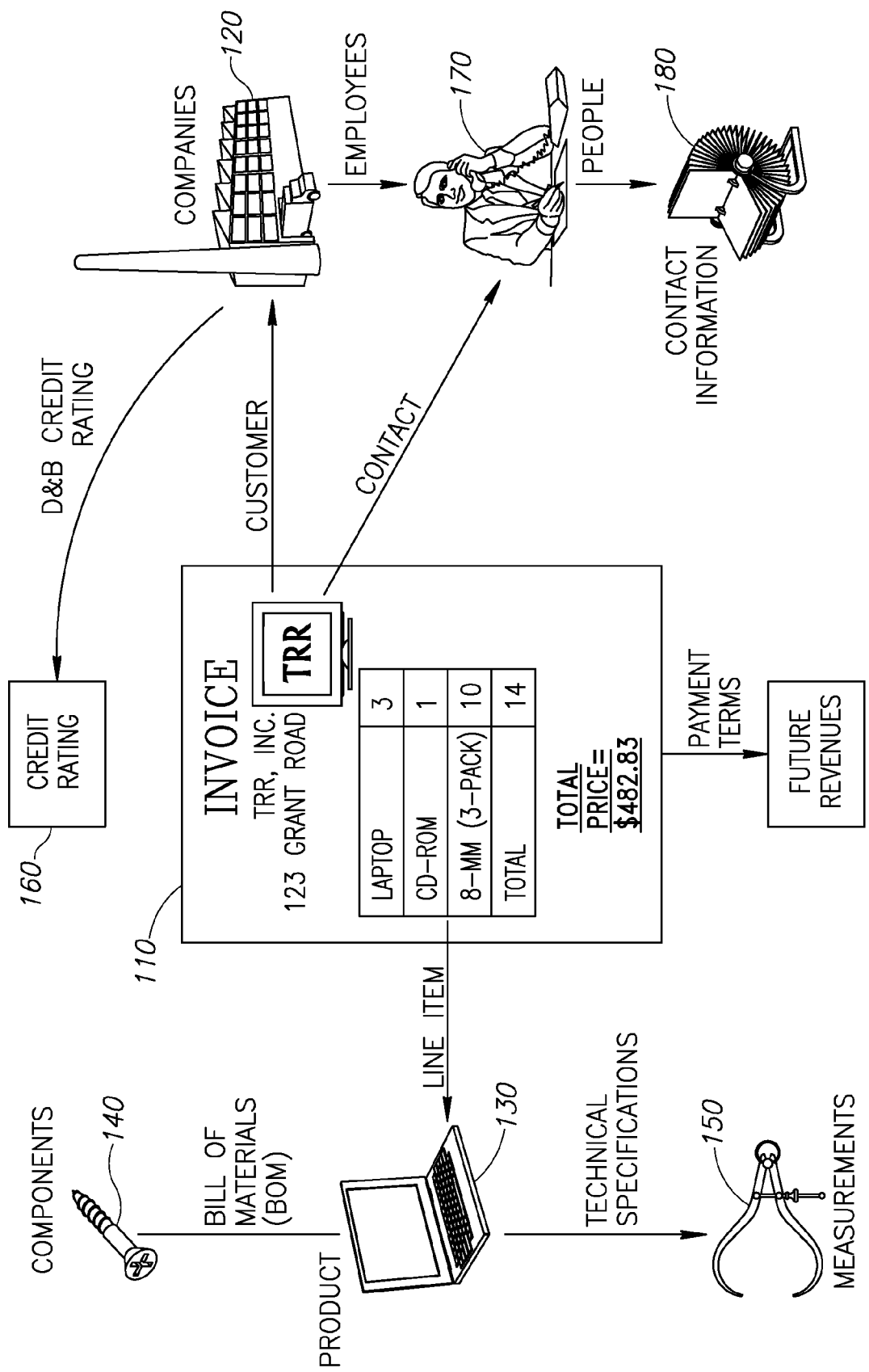
FIG. 1B is an illustration of graphlike relationships between ontology classes, corresponding to the relationships of FIG. 1A.

Examples of enterprise applications of distributed ontologies abound. The following is a simple example corresponding to FIG. 1.

A routine invoice is received from TRR, Inc. totalling $482.83. The 14 items listed in the invoice include 3 laptop computers, 1 CD-ROM and 10 3-packs of 8 mm cassettes. Information about TRR as a customer and their contact information, the payment terms for the $482.83, and detailed information about each of the three individual products are also available directly from the invoice. These categories are located within a larger abstract class called Companies, by viewing a relation Customer that describes the instance TRR within the class Companies. TRR customer information allows the user to view additional information about TRR or about other companies, including the ability to access the class of Dun & Bradstreet Credit Ratings. The D&B Credit Rating defines a relation for all enterprises between the classes Companies and Credit Ratings.

TRR employee information can be viewed by viewing a relation called Employees between the classes Companies and People. Once this is accomplished, the user views the relations of TRR employees to the superclass People. Possible attributes for the superclass People include date of birth, first name, middle initial, last name and identification number.

The payment terms for the current invoice relate to a class Future Revenues, and provide details about the overall future estimated performance of a company and how this is compiled.

Each individual line item listed in the TRR invoice is an instance of a class Products, which includes attributes SKU (Stock Keeping Unit), Manufacturer, Dimensions, Weight, and Standards. The classes Components and Measurements are separate classes related to the Products class through the relations Bills of Materials and Technical Specifications, respectively.

A syntax for the above example is as follows:

Classes
Laptop Computers
CD-ROMS
8 mm cassettes×8 mm cassettes×8 mm cassettes
Corporations
Addresses
Real Numbers
Character Strings
Latin Letters
D&B Credit Ratings
People
Dates
Integers
Products
Invoices
Legal Entities
Future Revenues Relations

| | |
|---|---|
| Customer_of | ⊆ Corporations × Legal Entities |
| Employee_of | ⊆ Corporations × Persons |
| Functions | |
| Invoice_Items: | Invoices → List[Products] |
| Price_in_US_dollars: | Products → Real Numbers |
| Total_$_invoice_bill: | Invoices → Real Numbers |
| Credit_Rating: | Legal Entities × Date → D&B Credit Ratings |
| Date_of_birth: | People → Dates |
| Given_name: | People → Character Strings |
| Surname: | People → Character Strings |
| Middle_initial: | People → Latin Letters |
| ID_number: | People → Integers |
| Payment_terms: | Invoices → Future Revenues |
| SKU: | Products → Integers |
| Manufacturer: | Products → Legal Entities |
| Dimensions_in_centimeters³: | Products → Real Numbers³ |
| Weight_in_kilograms: | Products → Real Numbers |
| bill_of_materials: | Products → Products |
| Cardinality_of_item_within_invoice: | Invoices × Products → Integers |
| Address_of: | Legal Entities → Addresses |
| Telephone_number: | Legal Entities → Integers |
| Inheritance | |
| Corporations | ⊆ Legal Entities |
| People | ⊆ Legal Entities |
| Laptop Computers | ⊆ Products |
| 8 mm Cassettes | ⊆ Products |
| Addresses | ⊆ Character Strings |
| Integers | ⊆ Real Numbers |

Reference is now made to Appendix A, which is a simplified listing of three example ontologies, in accordance with a preferred embodiment of the present invention. Appendix A includes examples of ontologies for (i) motor cars, (ii) airline travel, and (iii) purchase orders. Each example is described using an XML document according to an XML syntax, which has been developed for defining ontologies. While this particular syntax provides a central definition, the same syntax can be used in a distributed environment with remote classes referred to by URLs of defining documents together with local names of the classes within such document.

The example motor car ontology includes the following classes and relations:

Classes

1. Cars
2. CarManufacturers ⊆ LegalEntities
3. Models
4. Persons ⊆ LegalEntities
5. LegalEntities
6. FuelTypes
7. TireTypes
8. Contracts
9. TransmissionTypes
10. BrakeSystems
11. EngineTypes
12. Distances
13. Speeds Relations

| | |
|---|---|
| 1. owner | ⊆ Cars × LegalEntities |
| 2. insuranceCarrie | ⊆ Cars × LegalEntities |
| 3. insurancePolicy | ⊆ Cars × LegalEntities × Contracts |

Functions

| | |
|---|---|
| 1. make: | Cars → CarManufacturers |
| 2. fuelIntake: | Cars → FuelTypes |
| 3. color: | Cars → Colors |
| 4. tires: | Cars → TireTypes |
| 5. tireManufacturers: | TireTypes → LegalEntities |
| 6. transmission: | Cars → TranmissionTypes |
| 7. mileage: | Cars → Distances |
| 8. maximumSpeed: | Cars → Speeds |

The example airline travel ontology includes the following classes and relations:

Classes

1. LegalEntities
2. Airlines ⊆ LegalEntities
3. Airports
4. Persons ⊆ LegalEntities
5. Trips
6. Locations
7. Flights
8. AirplaneTypes Relations

| | |
|---|---|
| 1. travelers | ⊆ Trips × Persons |
| 2. destinations | ⊆ Trips × Locations |

Functions

| | |
|---|---|
| 1. carrier: | Flights → Airlines |
| 2. takeoff: | Flights → Airports |
| 3. landing: | Flights → Airports |
| 4. travelAgent: | Trips → LegalEntities |
| 5. airplane: | Flights → AirplaneTypes |
| 6. connectingFlight: | Trips × Persons × Flights → Flights |

The example airline travel ontology includes the following classes and relations:

Classes
1. LegalEntities
2. PurchaseOrders
3. Corporations ⊆ LegalEntities
4. Stockitems
5. Persons ⊆ LegalEntities
6. Addresses Relations

| | |
|---|---|
| 1. itemsPurchased | ⊆ PurchaseOrders × StockItems |
| 2. providers | ⊆ PurchaseOrders × LegalEntities |

| Functions | |
|---|---|
| 1. shipTo: | PurchaseOrders → Addresses |
| 2. customers: | PurchaseOrders → LegalEntities |
| 3. billTo: | PurchaseOrders → Addresses |

In a preferred embodiment of the present invention, the basic elements of an ontology are expressed within an "Ontology XML" document Reference is now made to Appendix B, which is a simplified listing of an XML Schema for an Ontology XML document, in accordance with a preferred embodiment of the present invention.

As can be seen in Appendix B, the main body of an Ontology XML document is preferably composed of three to five main sections. A declaration of the ontology's classes, a declaration of relations, and a declaration of functions are preferably required. Sections declaring certain complex classes and explicitly spelling out inheritance relations between classes may optionally be included as well.

Although the Schema in Appendix B anticipates inclusion of all definitions in one document, the same syntax is used to publish a fragment of an ontology on a distributed ontology web. To effect this, a full URL plus class name are preferably used instead of a local IDREF, to refer to a class.

It may be appreciated by those skilled in the art that an ontology stored in an XML document according to this Schema can easily be parsed using a program written using a parser, such as a parser with a DOM or SAX interface, and converted into a Java or C++ object oriented representation of the ontology model.

Header

There are certain elements that preferably appear in the header of an ontology document. At the top, as in all XML documents, the version of XML being used is declared, as follows:

<?xml version="1.0" encoding="UTF-8"?>

This declaration is preferably followed by an opening tag with the word "Ontology" followed by conventional XML namespace declarations and a pointer to the official copy of the ontology XML Schema:

<Ontology
xmlns:xsi="http://www.w3.org/1999/XMLSchema-instance"
xsi:noNamespaceSchlemaLocation="\\Calvin\ABC-Files\Departments\R-D\Releases\Release 0.1 Documents\OntSchema1.xsd"

Two preferably required fields follow: the version of the schema being used, and a description of the overall subject field that this particular ontology is modeling.
ABCSchemaVersion="0.1"
ontologyOf="Invoices"

The header preferably closes with two optional fields: one naming the author of the document, and one declaring the main language being used in the document A closing tag indicates the end of the header.
author="Fred Bloggs"
lang="en-UK">

Optionally, a general comment regarding the ontology is added at this point:
<comment> This is my first ontology </comment>

More than one comment may appear, and comments may appear in different languages and identified as such:
<comment lan="en"> That's it </comment>
<comment lang="fr"> C'est ça </comment>

All comment, description and example elements, wherever they appear in an ontology XML document, may appear more than once and in various languages.

Classes Declaration

The first block of the main body of an ontology XML document is a listing of declared classes. The simplest way of listing them is in the following style:

```
<classesDeclaration>
    <class classLabel="CD-ROMS"/>
    <class classLabel="Persons"> </class>
    <class classLabel="Legal_Entities"/>
    <class classLabel="Corporations"/>
    <class classLabel="Car_Manufacturers"/>
    <class classLabel="Products"/>
    <class classLabel="Real_Numbers"/>
    <class classLabel="Character_Strings"/>
    <class classLabel="Invoices"/>
    <class classLabel="Dates"/>
    <class classLabel="Credit_Ratings"/>
</classesDeclaration>
```

The opening tag is of the form <classesDeclaration>. It is followed by a list of <class> </class> tags, with a required attribute classLabel, containing a unique ID for each class. The </classesDeclaration> closes this block. At minimum, every classes declaration block preferably contains these elements.

The ClassesDeclaration block can be commented, if so desired, by inserting a comment tag as follows:

<comment> This is a list of classes for explanatory purposes. </comment>

Each individual class can similarly be commented:

```
<class classLabel="Corporations" >
    <comment lang="en"> This is here to show how comments may be added.
    </comment>
</class>
```

Separate elements for general descriptions and examples are also provided. Subclass and superclass relations can be included within appropriate class tags. In addition to the official "classLabel", numerous "userLabels" may also be added as attributes to a class, to indicate synonymous names that can be used interchangeably by different users to refer to the class. Finally, apart from the general names for a class, it may be desirable to use a different name for referring to particular instances. This is done by adding the attribute "instanceLabel":

```
<class classLabel="Corporations" userLabel="Companies"
instanceLabel="Company">
    <comment lang="en"> This is here to show how comments may be added.
    </comment>
    <description> Entities doing business. </description>
    <examples> General Motors, IBM, Panasonic </examples>
    <subClassOflabel="Legal_Entities"/>
    <superClassOflabel="Car_Manufacturers"/>
</class>
```

Complex Classes Declaration

Preferably, the complex classes declaration block is optional. It may be convenient for use when one makes frequent use of a particular complex class in domains and co-domains, because it enables reference to that complex class by use of a single label instead using an in-line description of the complex-class' structure repeatedly.

The overall syntax for a complex classes declaration block is similar to that of the classes declaration block:

```
<complexClassesDeclaration>
    <complexClass CClabel="setsOfPersons"
    userLabel="groupsOfHumans">
        <set>
            <classRef label="Persons"/>
        </set>
    </complexClass>
    <complexClass CClabel="lists_of_sets_of_corporations">
        <list>
            <set>
                <classRef label="Corporations"></classRef>
            </set>
        </list>
    </complexClass>
</complexClassesDeclaration>
```

Each complex class preferably has a CCLabel, similar to the classLabel assigned to classes, in order to provide unique identification. User labels may be added here as well.

Every complex class preferably opens with one of the tags <set>, <bag>, <list>, <intersection> or <Cartesian>. These tags may be nested as deeply as desired and in any order. The innermost layer of the nesting preferably contains a tag <classRef> with an attribute Label, whose value is preferably one of the class labels or use labels used to identify a class within the ClassesDeclaration block.

Descriptions and examples may be added here, just as they may in the ClassesDeclaration block.

Relations Declaration

Preferably, the relations declaration block is required, although it may be empty if one does not use relations in the ontology.

```
<relationsDeclaration>
    <relation relationLabel="customerOf">
        <domain>
            <classRef label="Corporations"/>
            <classRef label="Legal_Entities"/>
        </domain>
    </relation>
    <relation relationLabel="employee_of">
        <domain>
            <classRef label="Corporations"/>
            <classRef label="Persons"/>
        </domain>
    </relation>
</relationsDeclaration>
```

Every relation preferably has a "relationLabel" attribute—with an optional userLabel attribute. The <relation> tag is preferably followed by one and only one <domain> tag child element. The children elements of the <domain> tag are preferably a list of <classRef> tags, each with an obligatory "label" attribute whose value preferably is a labeled class or a complex-class. As above, comments, descriptions and examples, in multiple languages, may be freely added.

Functions Declaration

Preferably, the functions declaration block is required, although it may be empty if one does not use relations in the ontology.

```
<functionsDeclaration>
    <function functionLabel="princeInUSDollars">
        <domain>
            <classRef label="Products"/>
        </domain>
        <range>
            <classRef label="Real_Numbers"/>
        </range>
    </function>
    <function functionLabel="Surname">
        <domain>
            <classRef label="Persons"/>
        </domain>
        <range>
            <classRef label="Character_Strings"/>
        </range>
    </function>
</functionsDeclaration>
```

Every function preferably has a "functionLabel" attribute, with an optional userLabel attribute. The <function> tag is preferably followed by a <domain> tag child element and a <range> tag child element. The children elements of the <domain> element are preferably a list of <classRef> tags, each with an obligatory Label attribute whose value preferably is only a labeled class or complex-class. The same restriction preferably holds for the children of the <range> element. As always, comments, descriptions and examples, in multiple languages, may be freely added.

It may occur that the domain or range is a complex class; for example, when a function associates each invoice with a list of products appearing on the invoice. In such a case, one of two options may be used.

The first option is to describe the complex structure of the domain or range in-line, as follows:

```
<function functionLabel="invoiceItems">
    <domain>
        <classRef label="Invoices"/>
    </domain>
    <range>
        <list>
            <classRef label="Products"/>
        </list>
    </range>
</function>
```

The second option is to declare in the ComplexClassesDeclaration block the existence of a complex class for lists of Products, give it a label such as Product_List, and then use that label as the value of the classRef label attribute:

```
<function functionLabel="invoiceItems">
    <domain>
        <classRef label="Invoices"/>
    </domain>
    <range>
        <classRef label="Product_List"/>
    </range>
<function>
```

Inheritance Declaration

Preferably, the inheritance declaration block is optional. It enables the concentrated expression of the subclassing tree. For example:

```
<inheritanceDeclaration>
    <inheritancePair>
        <subclass label="Corporations"/>
        <superclass label="Legal_Entities"/>
    </inheritancePair>
</inheritanceDeclaration
```

Preferably, every inheritance declaration is a list of <inheritancePair> elements. Preferably, every <inheritancePair> element is followed by two children tag elements: <subclass> and <superclass>, in that order. The <subclass> and <superclass> elements are empty elements, in the sense that they have neither child elements nor text within them. They each carry a Label attribute, with a value from among the declared class labels.

Closing the Document

The closing tag preferably is:
</Ontology>

In reading the above description, persons skilled in the art will realize that there are many apparent variations that can be applied to the methods and systems described.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

APPENDIX A

```
Motor Cars
<Ontology
    xmlns=http://www.abc.com/schemas/ontology.xsd
    ontologyOf="motorCars"
    author="John Smith">
<classesDeclaration>
    <class classLabel="Cars">
        <classDescription>
            The motor vehicles we know, love and drive
        </classDescription>
    </class>
    <class classLabel="CarManufacturers">
        <classDescription>
            Corporations producing cars
        </classDescription>
        <subClassOf>
            <class classLabel="LegalEntities"/>
        </subClassOf>
    </class>
    <class classLabel="Models">
        <classDescription>
            e.g. SuperLancer, A4
        </classDescription>
    </class>
    <class classLabel="Persons">
        <classDescription>
            instances of the species *Homo Sapiens*
        </classDescription>
        <subClassOf>
            <class classLabel="LegalEntities">
        </subClassOf>
    </class>
```

-continued

APPENDIX A

```
    <class classLabel="LegalEntities">
        <classDescription>
            Corporations and Persons
        </classDescription>
    </class>
    <class classLabel="FuelTypes">
        <classDescription>
            unleaded, leaded, 96 octane, etc.
        </classDescription>
    </class>
    <class classLabel="TireTypes">
        <classDescription>
            SKUs of all the different sorts of tires there are out
            there
        </classDescription>
    </class>
    <class classLabel="Contracts">
        <classDescription>
            those pieces of paper lawyers compose and review
        </classDescription>
    </class>
    <class classLabel="TransmissionTypes">
        <classDescription>
            Will that be standard or automatic?
        </classDescription>
    </class>
    <class classLabel="BrakeSystems">
        <classDescription>
            power brakes, ABS and others
        </classDescription>
    </class>
    <class classLabel="EngineTypes">
        <classDescription>
            V8, 5-cylinder and others
        </classDescription>
    </class>
    <class classLabel="Distances">
        <classDescription>
            miles or kilometers, or feet and inches, or meters
        </classDescription>
    </class>
    <class classLabel="Speeds">
        <classDescription>
            mph, kph, knots per second
        </classDescription>
    </class>
</classesDeclaration>
<relationsDeclaration>
    <relation relationLabel=owner>
        <domain>
            <class classLabel="Cars" />
            <set>
                <class classLabel="LegalEntities">
            </set>
        </domain>
    </relation>
    <relation relationLabel=insuranceCarrier>
        <domain>
            <crossProduct>
                <class classLabel="Cars" />
                <set>
                    <class classLabel="LegalEntities />
                </set>
            </crossProduct>
            <class classLabel="LegalEntities"/>
        </domain>
    </relation>
    <relation relationLabel=insurancePolicy>
        <domain>
            <crossProduct>
                <class classLabel="Cars" />
                <set>
                    <class classLabel="LegalEntities />
                </set>
            </crossProduct>
            <class classLabel="Contracts" />
        </domain>
```

APPENDIX A -continued

```
            </relation>
    </relationsDeclaration>
    <functionsDeclaration>
            <function functionLabel=make>
                    <domain>
                            <class classLabel="Cars" />
                    </domain>
                    <range>
                            <set>
                                    <class classLabel="CarManufacturers" />
                            </set>
                    </range>
            </function>
            <function functionLabel=fuelIntake>
                    <domain>
                            <class classLabel="Cars" />
                    </domain>
                    <range>
                            <class classLabel="FuelTypes" />
                    </range>
            </function>
            <function functionLabel=color>
                    <domain>
                            <class classLabel="Cars" />
                    </domain>
                    <range>
                            <set>
                                    <class classLabel="Colors" />
                            </set>
                    </range>
            </function>
            <function functionLabel=tires>
                    <domain>
                            <class classLabel="Cars" />
                    </domain>
                    <range>
                            <bag>
                                    <class classLabel="TireTypes" />
                            </bag>
                    </range>
            </function>
            <function functionLabel=tireManufacturers>
                    <domain>
                            <class classLabel="TireTypes" />
                    </domain>
                    <range>
                            <class classLabel="LegalEntities" />
                    </range>
            </function>
            <function functionLabel=transmission>
                    <domain>
                            <class classLabel="Cars" />
                    </domain>
                    <range>
                            <class classLabel="TransmissionTypes" />
                    </range>
            </function>
            <function functionLabel=mileage>
                    <domain>
                            <class classLabel="Cars" />
                    </domain>
                    <range>
                            <class classLabel="Distances" />
                    </range>
            </function>
            <function functionLabel=maximumSpeed>
                    <domain>
                            <class classLabel="Cars" />
                    </domain>
                    <range>
                            <class classLabel="Speeds" />
                    </range>
            </function>
    </functionsDeclaration>
</Ontology>
Airline Travel
<Ontology
```

APPENDIX A -continued

```
    xmlns=http://www.abc.com/schemas/ontology.xsd
    ontologyOf="Airline_Travel">
    author="John Smith">
<classesDeclaration>
    <class classLabel="LegalEntities">
            <classDescription>
                    Corporations and Persons
            </classDescription>
    </class>
    <class classLabel="Airlines">
            <classDescription>
                    SABENA, BritishAir, El Al, TWA
            </classDescription>
            <subClassOf>
                    <class classLabel="LegalEntities"/>
            </subClassOf>
    </class>
    <class classLabel="Airports">
            <classDescription>
                    e.g. Heathrow, Gatwick, Dulles
            </classDescription>
    </class>
    <class classLabel="Persons">
            <classDescription>
                    instances of the species Homo Sapiens
            </classDescription>
            <subClassOf>
                    <class classLabel="LegalEntities">
            </subClassOf>
    </class>
    <class classLabel="Trips">
            <classDescription>
                    going on a journey
            </classDescription>
    </class>
    <class classLabel="Locations">
            <classDescription>
                    from your geography lessons
            </classDescription>
    </class>
    <class classLabel="Flights">
            <classDescription>
                    flap your wings
            </classDescription>
    </class>
    <class classLabel="AirplaneTypes">
            <classDescription>
                    Boeing 747, 777, DC-10, . . .
            </classDescription>
    </class>
</classesDeclaration>
<relationsDeclaration>
    <relation relationLabel=travelers>
            <domain>
                    <class classLabel="Trips"/>
                    <set>
                            <class classLabel="Persons">
                    </set>
            </domain>
    </relation>
    <relation relationLabel=destinations>
            <domain>
                    <class classLabel="Trips" />
                    <set>
                            <class classLabel="Locations" />
                    </set>
            </domain>
    </relation>
</relationsDeclaration>
<functionsDeclaration>
    <function functionLabel=carrier>
            <domain>
                    <class classLabel="Flights" />
            </domain>
            <range>
                    <class classLabel="Airlines" />
            </range>
    </function>
```

APPENDIX A

```
<function functionLabel=takeoff>
    <domain>
        <class classLabel="Flights" />
    </domain>
    <range>
        <class classLabel="Airports" />
    </range>
</function>
<function functionLabel=landing>
    <domain>
        <class classLabel="Flights" />
    </domain>
    <range>
        <class classLabel="Airports" />
    </range>
</function>
<function functionLabel=travelAgent>
    <domain>
        <class classLabel="Trips" />
    </domain>
    <range>
        <set>
            <class classLabel="LegalEntities" />
        </set>
    </range>
</function>
<function functionLabel=airplane>
    <domain>
        <class classLabel="Flights" />
    </domain>
    <range>
        <class classLabel="AirplaneTypes" />
    </range>
</function>
<function functionLabel=connectingFlight>
    <domain>
        <crossProduct>
            <class classLabel="Trips" />
            <class classLabel="Persons" />
            <class classLabel="Flights" />
        </crossProduct>
    </domain>
    <range>
        <class classLabel="Flights" />
    </range>
</function>
</functionsDeclaration>
</Ontology>
Purchase Order
<Ontology
    xmlns=http://www.abc.com/schemas/ontology.xsd
    ontologyOf="Purchase_Orders"
    author="John Smith">
<classesDeclaration>
    <class classLabel="LegalEntities">
        <classDescription>
            Corporations and Persons
        </classDescription>
    </class>
    <class classLabel="PurchaseOrders">
        <classDescription>
            requests for purchases
        </classDescription>
    </class>
    <class classLabel="Corporations">
        <classDescription>
            incs, ltds, and so forth
        </classDescription>
        <subClassOf>
            <class classLabel="LegalEntities"/>
        </subClassOf>
    </class>
    <class classLabel="StockItems">
        <classDescription>
            what is available for purchase
        </classDescription>
    </class>
```

APPENDIX A

```
<class classLabel="Persons">
    <classDescription>
        instances of the species Homo Sapiens
    </classDescription>
    <subClassOf>
        <class classLabel="LegalEntities">
    </subClassOf>
</class>
<class classLabel="Addresses">
    <classDescription>
        e.g., 47 Eden Street, Cambridge, postal code CB1 1JR
    </classDescription>
</class>
</classesDeclaration>
<relationsDeclaration>
    <relation relationLabel=itemsPurchased>
        <domain>
            <class classLabel="PurchaseOrder" />
            <set>
                <class classLabel="StockItems">
            </set>
        </domain>
    </relation>
    <relation relationLabel=providers>
        <domain>
            <class classLabel="PurchaseOrder" />
            <set>
                <class classLabel="LegalEntities" />
            </set>
        </domain>
    </relation>
</relationsDeclaration>
<functionsDeclaration>
    <function functionLabel=shipTo>
        <domain>
            <class classLabel="PurchaseOrders" />
        </domain>
        <range>
            <class classLabel="Addresses" />
        </range>
    </function>
    <function functionLabel=customers>
        <domain>
            <class classLabel="PurchaseOrders" />
        </domain>
        <range>
            <set>
                <class classLabel="LegalEntities" />
            </set>
        </range>
    </function>
    <function functionLabel=billTo>
        <domain>
            <class classLabel="PurchaseOrders" />
        </domain>
        <range>
            <class classLabel="Addresses" />
        </range>
    </function>
</functionsDeclaration>
</Ontology>
```

APPENDIX B

```xml
<?xml version="1.0" encoding="UTF-8"?>
<!DOCTYPE xsd:schema PUBLIC "-//W3C//DTD XMLSCHEMA 19991216//EN" "" [
    <!ENTITY % p 'xsd:'>
    <!ENTITY % s ':xsd'>
]>
<xsd:schema xmlns:xsd="http://www.w3.org/1999/XMLSchema"
elementFormDefault="qualified" version="0.1">
    <xsd:annotation>
        <xsd:documentation>
        Ontology description schema
        Copyright 2001 Unicorn Solutions Inc. All rights reserved
        </xsd:documentation>
    </xsd:annotation>
    <!-- the Ontology element defines the over-all structure of an ontology instance document
-->
    <xsd:element name="Ontology">
        <xsd:complexType>
            <xsd:sequence>
                <xsd:element name="comment" type="Comment" minOccurs="0"
maxOccurs="unbounded"/>
                <xsd:element name="classesDeclaration" type="Classes" minOccurs="1"
maxOccurs="1"/>
                <xsd:element name="complexClassesDeclaration" type="complexClasses"
minOccurs="0" maxOccurs="1"/>
                <xsd:element name="relationsDeclaration" type="Relations" minOccurs="1"
maxOccurs="1"/>
                <xsd:element name="functionsDeclaration" type="Functions" minOccurs="1"
maxOccurs="1"/>
                <xsd:element name="inheritanceDeclaration" type="Inheritance"
minOccurs="0" maxOccurs="1"/>
            </xsd:sequence>
            <xsd:attribute name="ABCSchemaVersion" type="xsd:number" use="required"/>
            <xsd:attribute name="ontologyOf" type="xsd:string" use="required"/>
            <xsd:attribute name="author" type="xsd:string" use="optional"/>
            <xsd:attribute name="lang" type="xsd:language" use="optional"/>
        </xsd:complexType>
    </xsd:element>
    <!-- definition of Classes type -->
    <xsd:complexType name="Classes">
        <xsd:element name="comment" type="Comment" minOccurs="0"
maxOccurs="unbounded"/>
        <xsd:element name="class" minOccurs="1" maxOccurs="unbounded">
            <xsd:complexType>
                <xsd:sequence>
                    <xsd:element name="comment" type="Comment" minOccurs="0"
maxOccurs="unbounded" />
                    <xsd:element name="description" type="Comment" minOccurs="0"
maxOccurs="unbounded"/>
                    <xsd:element name="examples" type="Comment" minOccurs="0"
maxOccurs="unbounded"/>
                    <xsd:element name="subClassOf" minOccurs="0" maxOccurs="unbounded"
type="classRef"/>
                    <xsd:element name="superClassOf" minOccurs="0"
maxOccurs="unbounded" type="classRef"/>
                </xsd:sequence>
                <xsd:attribute name="classLabel" type="xsd:ID" use="required"/>
                <xsd:attribute name="userLabel" type="xsd:ID" use="optional"/>
                <xsd:attribute name="instanceLabel" type="xsd:ID" use="optional" />
            </xsd:complexType>
        </xsd:element>
    </xsd:complexType>
    <!-- definition of domain type -->
    <xsd:complexType name="domainType">
        <xsd:group>
            <xsd:element name="classRef" minOccurs="0" maxOccurs="unbounded"
type="classRef"/>
            <xsd:element name="set" minOccurs="0" maxOccurs="unbounded"
type="setType"/>
            <xsd:element name="bag" minOccurs="0" maxOccurs="unbounded"
type="bagType"/>
            <xsd:element name="list" minOccurs="0" maxOccurs="unbounded"
type="listType"/>
            <xsd:element name="intersection" minOccurs="0" maxOccurs="unbounded"
type="intersectionType"/>
            <xsd:element name="Cartesian" minOccurs="0" maxOccurs="unbounded"
type="CartesianType"/>
        </xsd:group>
```

APPENDIX B

```
    </xsd:complexType>
    <!-- definition of Relations type -->
    <xsd:complexType name="relationType">
        <xsd:element name="comment" type="Comment" minOccurs="0" maxOccurs="unbounded"/>
        <xsd:element name="description" type="Comment" minOccurs="0" maxOccurs="unbounded" />
        <xsd:element name="examples" type="Comment" minOccurs="0" maxOccurs="unbounded"/>
        <xsd:element name="domain" type="domainType" minOccurs="1" maxOccurs="1"/>
        <xsd:attribute name="relationLabel" type="xsd:ID" use="required"/>
        <xsd:attribute name="userLabel" type="xsd:ID" use="optional"/>
    </xsd:complexType>
    <xsd:complexType name="Relations">
        <xsd:element name="comment" type="Comment" minOccurs="0" maxOccurs="unbounded"/>
        <xsd:element name="relation" type="relationType" minOccurs="0" maxOccurs="unbounded"/>
    </xsd:complexType>
    <!-- definition of Functions type -->
    <xsd:complexType name="functionType">
        <xsd:element name="comment" type="Comment" minOccurs="0" maxOccurs="unbounded"/>
        <xsd:element name="description" type="Comment" minOccurs="0" maxOccurs="unbounded" />
        <xsd:element name="examples" type="Comment" minOccurs="0" maxOccurs="unbounded"/>
        <xsd:element name="domain" type="domainType" minOccurs="1" maxOccurs="1"/>
        <xsd:element name="range" type="domainType" minOccurs="1" maxOccurs="1"/>
        <xsd:attribute name="functionLabel" type="xsd:ID" use="required"/>
        <xsd:attribute name="userLabel" type="xsd:ID" use="optional"/>
    </xsd:complexType>
    <xsd:complexType name="Functions">
        <xsd:element name="comment" type="Comment" minOccurs="0" maxOccurs="unbounded"/>
        <xsd:element name="function" type="functionType" minOccurs="0" maxOccurs="unbounded"/>
    </xsd:complexType>
    <!-- definition of Inheritance type -->
    <xsd:complexType name="pairType">
        <xsd:sequence>
            <xsd:element name="comment" type="Comment" minOccurs="0" maxOccurs="unbounded"/>
            <xsd:element name="examples" type="Comment" minOccurs="0" maxOccurs="unbounded"/>
            <xsd:element name="subclass" minOccurs="1" maxOccurs="1" type="classRef"/>
            <xsd:element name="superclass" minOccurs="1" maxOccurs="1" type="classRef"/>
        </xsd:sequence>
    </xsd:complexType>
    <xsd:complexType name="Inheritance">
        <xsd:sequence>
            <xsd:element name="inheritancePair" type="pairType" minOccurs="0" maxOccurs="unbounded"/>
        </xsd:sequence>
    </xsd:complexType>
    <!-- definition of Set type -->
    <xsd:complexType name="setType">
      <xsd:choice>
        <xsd:element name="classRef" type="classRef"/>
        <xsd:element name="bag" type="bagType"/>
        <xsd:element name="set" type="setType"/>
        <xsd:element name="list" type="listType"/>
        <xsd:element name="intersection" type="intersectionType"/>
        <xsd:element name="Cartesian" type="CartesianType"/>
      </xsd:choice>
    </xsd:complexType>
    <!-- definition of Bag type -->
    <xsd:complexType name="bagType">
      <xsd:choice>
        <xsd:element name="classRef" type="classRef"/>
        <xsd:element name="set" type="setType"/>
        <xsd:element name="bag" type="bagType"/>
        <xsd:element name="list" type="listType"/>
        <xsd:element name="intersection" type="intersectionType"/>
        <xsd:element name="Cartesian" type="CartesianType"/>
      </xsd:choice>
```

APPENDIX B

```xml
    </xsd:complexType>
    <!-- definition of List type -->
    <xsd:complexType name="listType">
       <xsd:choice>
          <xsd:element name="classRef" type="classRef"/>
          <xsd:element name="set" type="setType"/>
          <xsd:element name="bag" type="bagType"/>
          <xsd:element name="list" type="listType"/>
          <xsd:element name="intersection" type="intersectionType"/>
          <xsd:element name="Cartesian" type="CartesianType"/>
       </xsd:choice>
    </xsd:complexType>
    <!-- definition of Cartesian product type -->
    <xsd:complexType name="CartesianType">
       <xsd:choice>
          <xsd:element name="classRef" type="classRef" minOccurs="0" maxOccurs="unbounded"/>
          <xsd:element name="set" type="setType" minOccurs="0" maxOccurs="unbounded"/>
          <xsd:element name="bag" type="bagType" minOccurs="0" maxOccurs="unbounded"/>
          <xsd:element name="list" type="listType" minOccurs="0" maxOccurs="unbounded"/>
          <xsd:element name="intersection" type="intersectionType" minOccurs="0" maxOccurs="unbounded"/>
          <xsd:element name="Cartesian" type="CartesianType" minOccurs="0" maxOccurs="unbounded"/>
       </xsd:choice>
    </xsd:complexType>
    <!-- definition of intersection type -->
    <xsd:complexType name="intersectionType">
       <xsd:choice>
          <xsd:sequence>
             <xsd:element name="classRef" type="classRef" minOccurs="2" maxOccurs="unbounded"/>
          </xsd:sequence>
          <xsd:sequence>
             <xsd:element name="set" type="setType" minOccurs="2" maxOccurs="unbounded"/>
          </xsd:sequence>
          <xsd:sequence>
             <xsd:element name="bag" type="bagType" minOccurs="2" maxOccurs="unbounded"/>
          </xsd:sequence>
          <xsd:sequence>
             <xsd:element name="list" type="listType" minOccurs="2" maxOccurs="unbounded"/>
          </xsd:sequence>
          <xsd:sequence>
             <xsd:element name="Cartesian" type="CartesianType" minOccurs="2" maxOccurs="unbounded"/>
          </xsd:sequence>
       </xsd:choice>
    </xsd:complexType>
    <!-- definition of ClassRef type -->
    <xsd:complexType name="classRef" content="empty">
       <xsd:attribute name="label" type="xsd:IDREF" use="required"/>
    </xsd:complexType>
    <!-- definition of Complex Classes type -->
    <xsd:complexType name="complexClasses">
       <xsd:element name="comment" type="Comment" minOccurs="0" maxOccurs="unbounded"/>
       <xsd:element name="complexClass" minOccurs="1" maxOccurs="unbounded">
          <xsd:complexType>
             <xsd:sequence>
                <xsd:element name="comment" type="Comment" minOccurs="0" maxOccurs="unbounded"/>
                <xsd:element name="description" type="Comment" minOccurs="0" maxOccurs="unbounded" />
                <xsd:element name="examples" type="Comment" minOccurs="0" maxOccurs="unbounded"/>
                <xsd:choice>
                   <xsd:element name="set" type="setType"/>
                   <xsd:element name="bag" type="bagType"/>
                   <xsd:element name="list" type="listType"/>
                   <xsd:element name="intersection" type="intersectionType"/>
                   <xsd:element name="Cartesian" type="CartesianType"/>
```

-continued

APPENDIX B

```
        </xsd:choice>
      </xsd:sequence>
      <xsd:attribute name="CCLabel" type="xsd:ID" use="required"/>
      <xsd:attribute name="userLabel" type="xsd:ID" use="optional"/>
    </xsd:complexType>
  </xsd:element>
</xsd:complexType>
<!-- definition of comment type -->
<xsd:complexType name="Comment" content="mixed">
  <xsd:attribute name="lang" type="xsd:language" use="optional" />
</xsd:complexType>
</xsd:schema>
```

What is claimed is:

1. A distributed ontology system for responding to queries comprising:

a central computer within the distributed ontology system comprising a global ontology directory, the global ontology directory indexing class and relation definitions, wherein class definitions define ontological classes, the ontological classes being sets of instances having a common characterization, and relation definitions define ontological relations, the ontological relations being inter-relationships between classes that are used to relate instances of one or more classes;

a plurality of ontology server computers, comprising:

a corresponding plurality of repositories, each repository of the plurality of repositories containing different portions of the class and relation definitions and different portions of superclass-subclass definitions, and wherein at least one superclass-subclass definition is contained in a repository of the plurality of repositories that resides on a different ontology server computer than the ontology server computer housing the repository containing the definition of the subclass or the ontology server computer housing the repository containing the definition of the superclass; and a corresponding plurality of query processors for responding to queries relating to the class and the relation definitions in said plurality of repositories;

an authoring tool communicating with said repositories for updating said repositories, comprising:

a validator for ensuring that updates made to said repositories maintain backward compatibility, so that expressions that were valid before being updated remain valid after said updating is performed; and a relation editor for editing relation definitions in said repositories, by expanding domains of relations;

an Extensible Markup Language (XML) embedder communicating with said repositories for embedding an XML Schema within a designated repository by identifying class and relation definitions implicit in the XML Schema, wherein said identifying comprises user-aided choosing of class and relation definitions implicit in the XML Schema that are embedded within the designated repository; and a computer network connecting said central computer with said plurality of ontology server computers.

2. The system of claim 1 wherein at least one relation definition within an ontology server computer repository references class definitions from a repository within a different ontology server computer.

3. The system of claim 1 wherein at least one of said plurality of ontology server computers further comprise a publisher for publishing class and relation definitions in its repository to said global ontology directory.

4. The system of claim 1 wherein said central computer further comprises an agent for seeking out class and relation definitions included in said repositories.

5. The system of claim 1 wherein said authoring tool has a capability to browse repositories of a plurality of ontology server computers.

6. The system of claim 1 wherein said authoring tool further comprises a class adder for adding new class definitions to said repositories.

7. The system of claim 1 wherein said authoring tool further comprises a class editor for editing class definitions in said repositories.

8. The system of claim 1 wherein said authoring tool further comprises a relation adder for adding relation definitions to said repositories.

9. The system of claim 1 further comprising a search engine for searching for class or relation definitions.

10. The system of claim 9 wherein said search engine resides on at least one of said plurality of ontology server computers.

11. The system of claim 9 wherein said search engine resides on said central computer.

12. The system of claim 9 further comprising an ontology toolkit comprising:

a search tool, for searching said global ontology directory; and a query tool for querying at least one of said plurality of repositories.

13. The system of claim 1 wherein the class and relation definitions within said repositories include authorship data.

14. The system of claim 13 further comprising a web filter for generating a filtered ontology based on constraints on authorship data.

15. The system of claim 1 further comprising a text file embedder for embedding a text file having a description of a class within a repository.

16. The system of claim 1 further comprising a view generator for generating a view of a class by associating with the class a subset of attributes of the class.

17. The system of claim 16 wherein the subset of attributes of the class includes composed functions.

18. The system of claim 16 wherein at least one attribute in the subset of attributes is further associated with a view of the co-domain of the attribute.

19. The system of claim 16 further comprising an XML generator for generating a single XML Schema type element from the view.

20. The system of claim 16 further comprising an XML generator for generating an XML Schema from the view.

21. The system of claim 20 wherein said XML generator generates an XML Schema with aid of a user choosing which class and relation definitions are to be included in the XML Schema.

22. The system of claim 21 further comprising a class and relation navigation tool for guiding the user in choosing class and relation definitions.

23. The system of claim 16 further comprising a designator for designating class and relation definitions that are required and for designating class and relation definitions that are optional.

24. The system of claim 1 further comprising a graphical user interface including icons for displaying instances of classes.

25. The system of claim 24 further wherein said graphical user interface also includes icons for displaying sets of instances defined by a logical term.

26. The system of claim 1 further comprising an ontology navigation tool for viewing class and relation definitions.

27. A distributed ontology method for responding to queries comprising:
providing a central computer within a distributed ontology system comprising a global ontology directory;
connecting said central computer with a plurality of ontology server computers via a computer network;
managing said global ontology directory for a distributed ontology, the global ontology directory indexing class and relation definitions, wherein class definitions define ontological classes, the ontological classes being sets of instances having a common characterization, and relation definitions define ontological relations, the ontological relations being inter-relationships between classes that are used to relate instances of one or more classes;
managing a plurality of repositories, each repository of the plurality of repositories residing on an ontology server computer of the plurality of ontology server computers, and each repository of the plurality of repositories including a different portion of the class and relation definitions and a different portion of superclass-subclass definitions, wherein at least one superclass-subclass definition resides in a different repository of the plurality of repositories than the repository containing the definition of the subclass or the repository containing the definition of the superclass;
updating the repositories comprising:
validating that updates made to the repositories maintain backward compatibility, so that expressions that were valid before being updated remain valid after said updating is performed; and
editing relation definitions in the repositories, by expanding domains of relations;
communicating with the repositories for embedding an Extensible Markup Language (XML) Schema within a designated repository by identifying class and relation definitions implicit in the XML Schema, with aid of a user choosing which class and relation definitions implicit in the XML Schema are embedded within the designated repository; and
responding to queries relating to the class and the relation definitions in at least one repository of the repositories.

28. The method of claim 27 wherein at least one relation definition within a repository references class definitions from within a different repository.

29. The method of claim 27 further comprising publishing class and relation definitions within at least one repository to the global ontology directory.

30. The method of claim 27 further comprising seeking out class and relation definitions included in the repositories.

31. The method of claim 27 wherein said updating further comprises browsing a plurality of repositories.

32. The method of claim 27 wherein said updating further comprises adding new class definitions to the repositories.

33. The method of claim 27 wherein said updating further comprises editing class definitions in the repositories.

34. The method of claim 27 wherein said updating tool further comprises adding relation definitions to the repositories.

35. The method of claim 27 further comprising searching for class or relation definitions.

36. The method of claim 35 further comprising:
searching the global ontology directory; and
querying at least one of the plurality of repositories.

37. The method of claim 27 wherein the class and relation definitions in the repositories include authorship data.

38. The method of claim 37 further comprising generating a filtered ontology based on constraints on authorship data.

39. The method of claim 27 further comprising embedding a text file having a description of a class within a repository.

40. The method of claim 27 further comprising generating a view of a class, by associating with the class a subset of attributes of the class.

41. The system of claim 40 wherein the subset of attributes of the class includes composed functions.

42. The system of claim 40 wherein at least one attribute in the subset of attributes is further associated with a view of the co-domain of the attribute.

43. The system of claim 40 further comprising generating a single XML Schema type element from the view.

44. The system of claim 40 further comprising generating an XML Schema from the view.

45. The method of claim 44 wherein said generating comprises user-aided choosing which class and relation definitions are to be included within the XML Schema.

46. The method of claim 45 further comprising navigating through class and relation definitions to guide said user-aided choosing.

47. The method of claim 40 further comprising designating class and relation definitions that are required, and designating class and relation definitions that are optional.

48. The method of claim 27 further comprising displaying icons representing instances of classes.

49. The method of claim 48 further comprising displaying icons representing sets of instances defined by a logical term.

50. The method of claim 27 further comprising navigating through class and relation definitions.

51. An ontology system for responding to queries comprising:
a central computer within a distributed ontology system comprising a global ontology directory for an ontology, the global ontology directory indexing class and relation definitions, wherein class definitions define ontological classes, the ontological classes being sets of instances having a common characterization, and relation definitions define ontological relations, the ontological relations being inter-relationships between classes that are used to relate instances of one or more classes;

a computer network connecting said central computer with a plurality of ontology server computers;

said plurality of ontology server computers comprising:

a plurality of repositories, each repository including a different portion of the class and relation definitions and a different portion of superclass-subclass definitions, wherein at least one superclass-subclass definition resides in a different repository of the plurality of repositories than the repository containing the definition of the subclass or the repository containing the definition of the superclass;

an authoring tool for updating said repositories, comprising:

a validator for ensuring that updates made to said repositories maintain backward compatibility, so that expressions that were valid before being updated remain valid after said updating is performed; and a relation editor for editing relation definitions in said repositories, by expanding domains of relations;

an Extensible Markup Language (XML) embedder communicating with said repositories for embedding an XML Schema within a designated repository with aid of a user choosing class and relation definitions implicit in the XML Schema that are embedded within the designated repository;

an agent for seeking out class and relation definitions included in said repositories; and a query processor for responding to queries relating to the class and the relation definitions in said repositories.

52. The system of claim 51 wherein at least one relation definition within a repository references class definitions from within a different repository.

53. The system of claim 51 further comprising a publisher for publishing class and relation definitions within at least one of said repositories to said global ontology directory.

54. The system of claim 51 wherein said authoring tool has a capability to browse a plurality of repositories.

55. The system of claim 51 wherein said authoring tool further comprises a class adder for adding new class definitions to said repositories.

56. The system of claim 51 wherein said authoring tool further comprises a class editor for editing class definitions in said repositories.

57. The system of claim 51 wherein said authoring tool further comprises a relation adder for adding relation definitions to said repositories.

58. The system of claim 51 further comprising an ontology toolkit comprising:

a search tool, for searching said global ontology directory; and a query tool for querying at least one of said plurality of repositories.

59. The system of claim 51 wherein the class and relation definitions in said repository include authorship data.

60. The system of claim 59 further comprising a web filter for generating a filtered ontology based on constraints on authorship data.

61. The system of claim 51 further comprising a text file embedder for embedding a text file having a description of a class within a repository.

62. The system of claim 51 further comprising a view generator for generating a tree of attributes from class and relation definitions.

63. The system of claim 62 wherein said view generator is an XML generator for generating an XML Schema from class and relation definitions.

64. The system of claim 63 wherein said XML generator generates an XML Schema with aid of a user choosing which class and relation definitions are to be included within the XML Schema.

65. The system of claim 64 further comprising a class and relation navigation tool for guiding the user in choosing class and relation definitions.

66. The system of claim 62 further comprising a designator for designating class and relation definitions that are required, and for designating class and relation definitions that are optional.

67. The system of claim 51 further comprising a graphical user interface including icons for displaying instances of classes.

68. The system of claim 67 further wherein said graphical user interface also includes icons for displaying sets of instances defined by a logical term.

69. The system of claim 51 further comprising an ontology navigation tool for viewing class and relation definitions.

* * * * *